(12) United States Patent
Johnson et al.

(10) Patent No.: US 11,480,186 B2
(45) Date of Patent: Oct. 25, 2022

(54) ASSEMBLY BLOWER AND ASSOCIATED METHOD

(71) Applicant: Regal Beloit America, Inc., Beloit, WI (US)

(72) Inventors: Philip Wayne Johnson, Bluffton, IN (US); Rachele Barbara Cocks, Columbia City, IN (US); Shailesh Prabhakar Waikar, Perry Hall, MD (US); Michael R Koller, Columbia City, IN (US); John Sheldon Wagley, Winona Lake, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 627 days.

(21) Appl. No.: 16/223,520

(22) Filed: Dec. 18, 2018

(65) Prior Publication Data
US 2019/0120241 A1  Apr. 25, 2019

Related U.S. Application Data

(63) Continuation-in-part of application No. 14/639,167, filed on Mar. 5, 2015, now abandoned.

(51) Int. Cl.
*F04D 27/00* (2006.01)
*F04D 15/00* (2006.01)
(Continued)

(52) U.S. Cl.
CPC ....... *F04D 27/002* (2013.01); *F04D 15/0027* (2013.01); *F04D 25/08* (2013.01);
(Continued)

(58) Field of Classification Search
CPC .... F04D 15/0027; F04D 25/08; F04D 27/002; F04D 27/003; F04D 27/004;
(Continued)

(56) References Cited

U.S. PATENT DOCUMENTS

| | | | |
|---|---|---|---|
| 2,210,329 A | 8/1940 | Schweizer | |
| 2,702,539 A | 2/1955 | Cayot | |

(Continued)

FOREIGN PATENT DOCUMENTS

EP  433939 B1  6/1991

OTHER PUBLICATIONS

Technical Characteristics of Flexinol Circle R Actuator Wires, HTTP://www.dynalloy.com, 1562 Reynolds Avenue, Irvine, California 92614 F1140 Rev 1.2, 12 pages.

*Primary Examiner* — Christopher R Legendre
(74) *Attorney, Agent, or Firm* — Armstrong Teasdale LLP

(57) ABSTRACT

A blower assembly for advancing the flow of air in an air flow device at a selected one of a plurality of air flow rates. The blower assembly includes a blower housing defining a body thereof and a wall of the blower housing moveably secured to the body, a blower wheel rotatably mounted to the blower housing and a motor for rotating the blower wheel at a selected one of a plurality of rotational speeds. The blower assembly further includes a motion device secured to the body and to the wall. The motion device moves the wall relative to the body to a selected one of a plurality of distinct wall positions. The motor rotates the blower wheel at a selected one of a plurality of rotational speeds. A controller calculates an optimum wall position and rotational speed to provide for minimal energy usage rate.

16 Claims, 19 Drawing Sheets

(51) Int. Cl.
  *F04D 25/08*  (2006.01)
  *F04D 29/30*  (2006.01)
  *F04D 29/36*  (2006.01)
  *F04D 29/46*  (2006.01)
  *F04D 29/52*  (2006.01)
  *F04D 29/56*  (2006.01)
  *F04D 29/42*  (2006.01)

(52) U.S. Cl.
  CPC ......... *F04D 27/003* (2013.01); *F04D 27/004* (2013.01); *F04D 27/007* (2013.01); *F04D 29/30* (2013.01); *F04D 29/362* (2013.01); *F04D 29/4226* (2013.01); *F04D 29/464* (2013.01); *F04D 29/524* (2013.01); *F04D 29/563* (2013.01); *F05D 2250/52* (2013.01); *F05D 2300/505* (2013.01)

(58) Field of Classification Search
  CPC ...... F04D 27/005; F04D 27/007; F04D 29/30; F04D 29/362; F04D 29/4226; F04D 29/444; F04D 29/46; F04D 29/464; F04D 29/494; F04D 29/524; F04D 29/563; F24F 13/08; F24F 13/14
  See application file for complete search history.

(56) References Cited

U.S. PATENT DOCUMENTS

| | | |
|---|---|---|
| 2,804,869 A | 9/1957 | Besser |
| 3,056,541 A | 10/1962 | Foweraker |
| 3,111,940 A | 11/1963 | Wilhoite et al. |
| 3,558,672 A | 1/1971 | Johnson |
| 3,662,738 A | 5/1972 | Solka et al. |
| 4,086,781 A | 5/1978 | Brody et al. |
| 4,217,877 A | 8/1980 | Uhlyarik |
| 4,261,326 A | 4/1981 | Ihlenfield |
| 4,299,535 A | 11/1981 | Brockman et al. |
| 4,662,819 A | 5/1987 | Lakowske et al. |
| 4,930,944 A | 6/1990 | VanGinhoven |
| 5,005,636 A | 4/1991 | Haessig |
| 5,368,010 A | 11/1994 | Weber et al. |
| 6,446,876 B1 | 9/2002 | Stefano et al. |
| 6,729,551 B2 | 5/2004 | Lyons et al. |
| 8,125,096 B2 | 2/2012 | Shifrin et al. |
| 8,197,193 B2 | 6/2012 | Messmer |
| 8,641,361 B2 | 2/2014 | June et al. |
| 8,657,558 B2 | 2/2014 | June et al. |
| 2004/0165984 A1 | 8/2004 | Ochiai et al. |
| 2005/0087614 A1 | 4/2005 | Ruise |
| 2011/0250048 A1 | 10/2011 | June et al. |
| 2012/0288363 A1 | 11/2012 | Yumoto et al. |
| 2016/0258438 A1 | 9/2016 | Johnson et al. |
| 2019/0120241 A1* | 4/2019 | Johnson ............... F04D 27/007 |

* cited by examiner

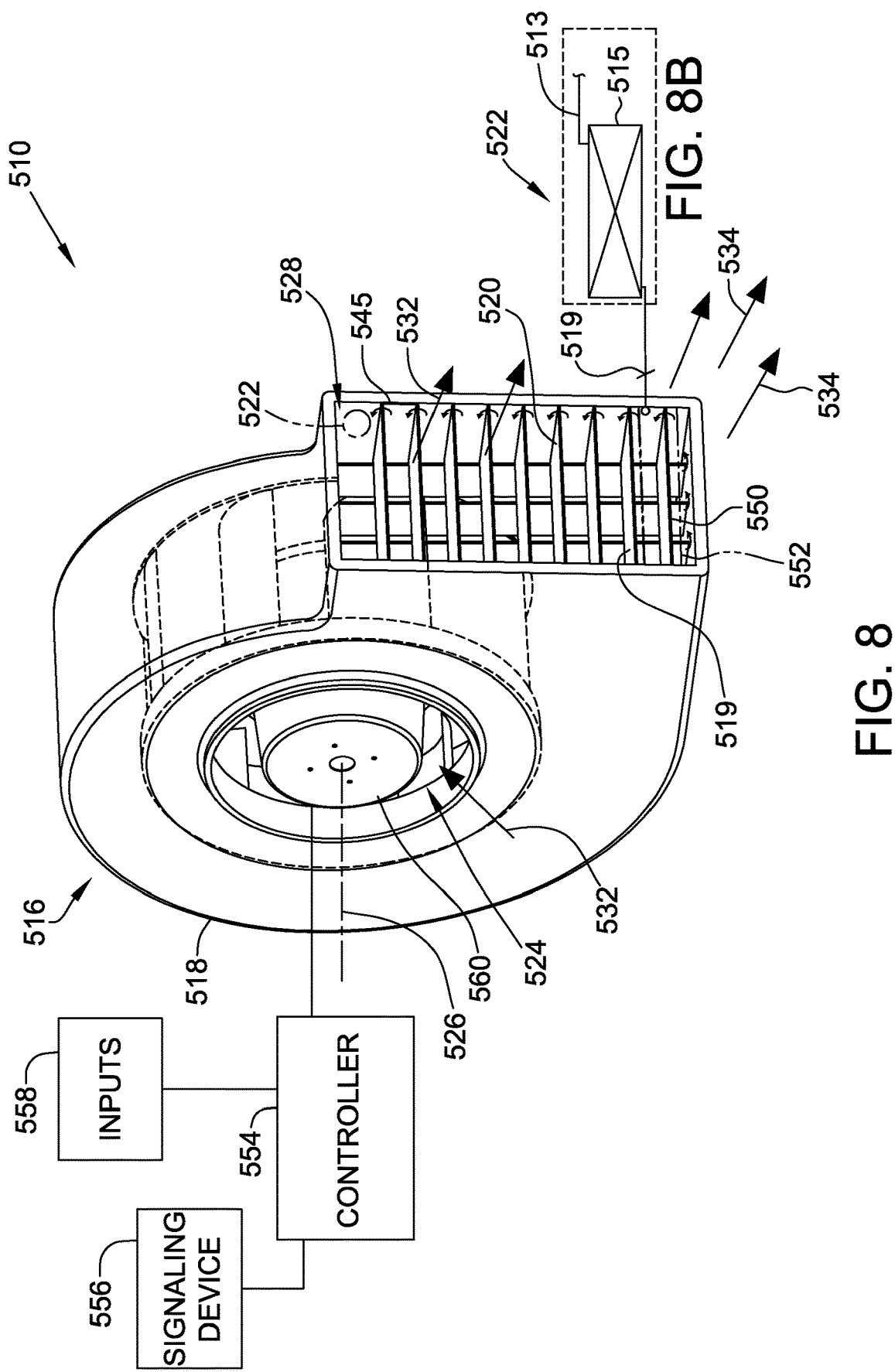

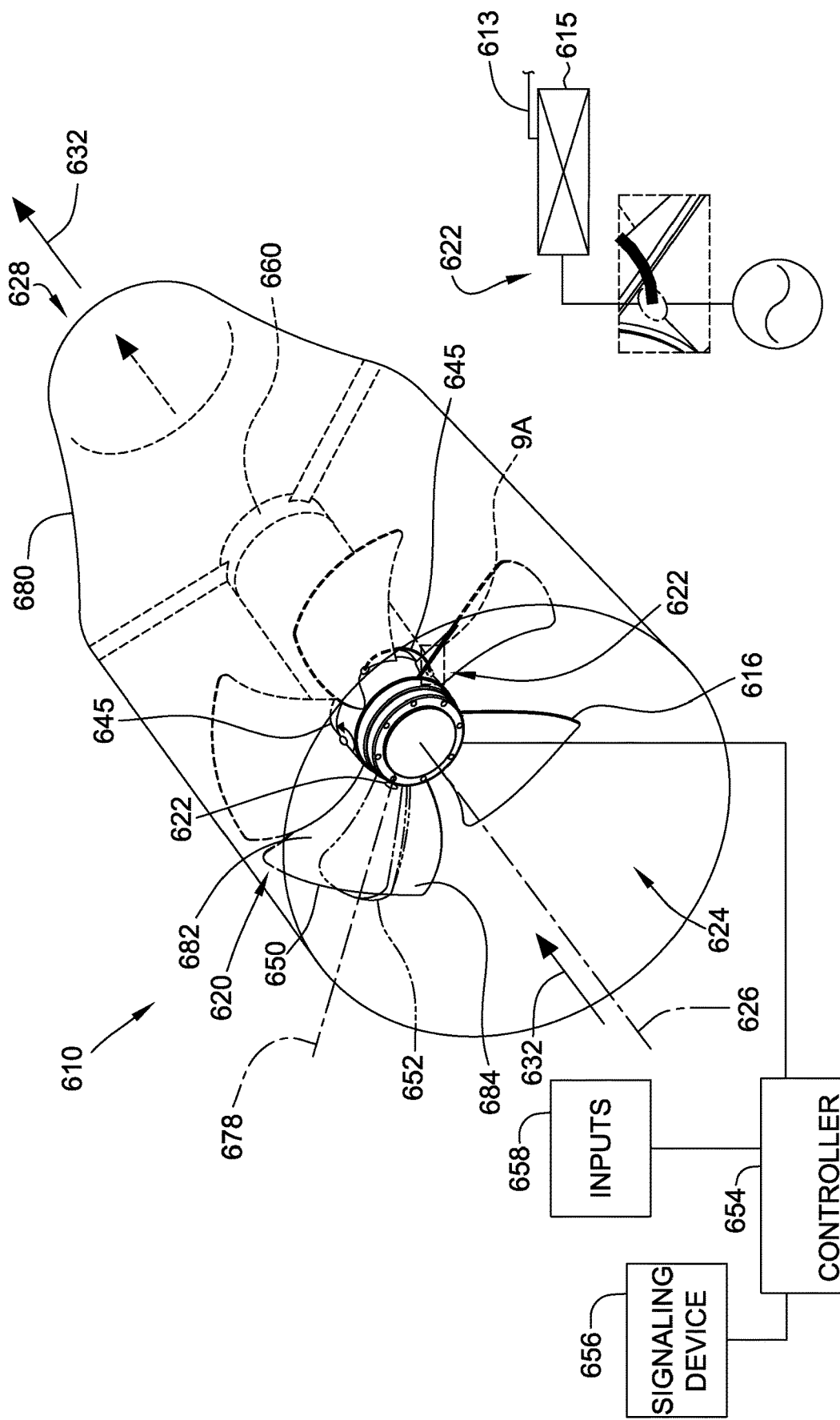

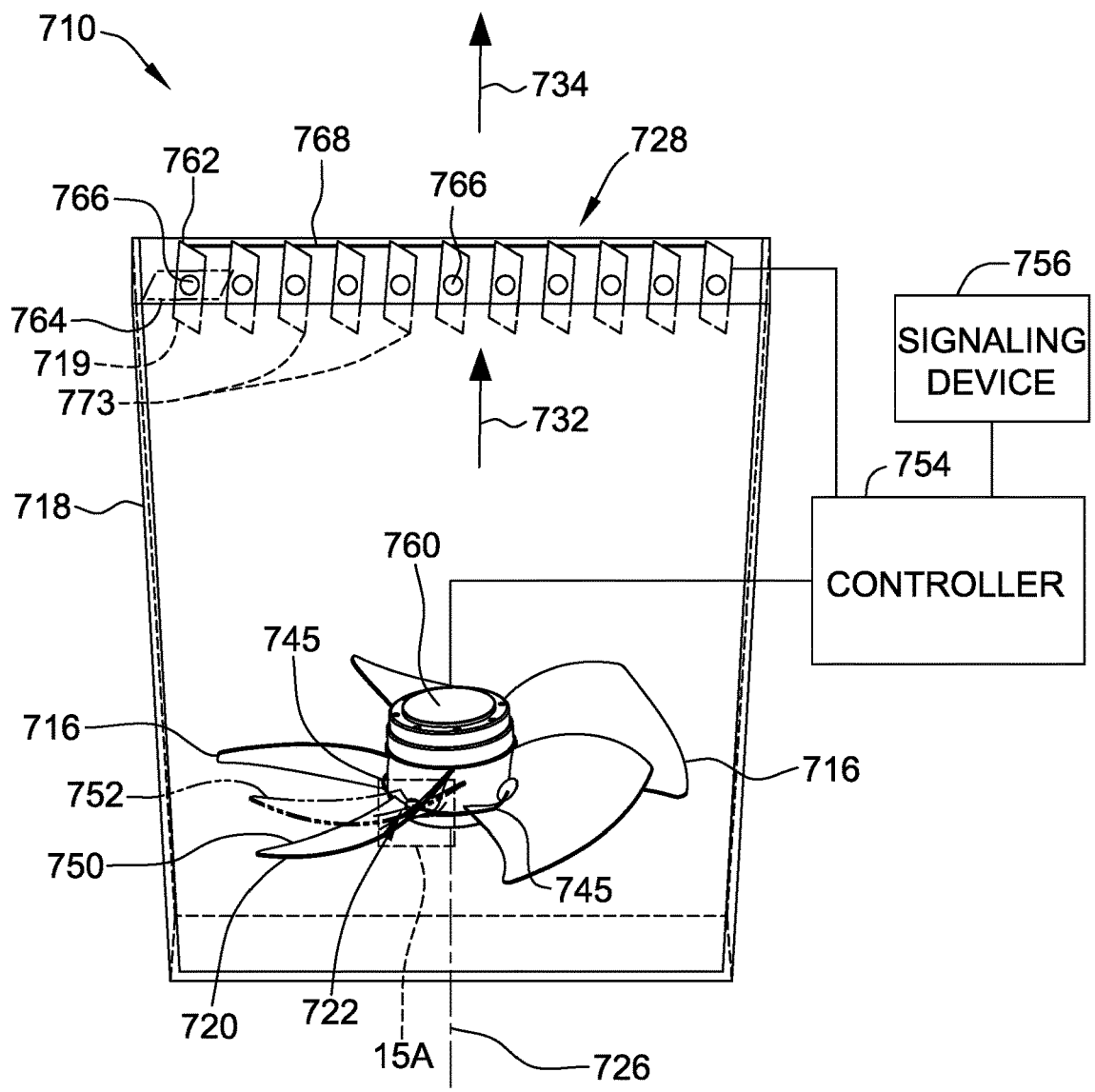
FIG. 15
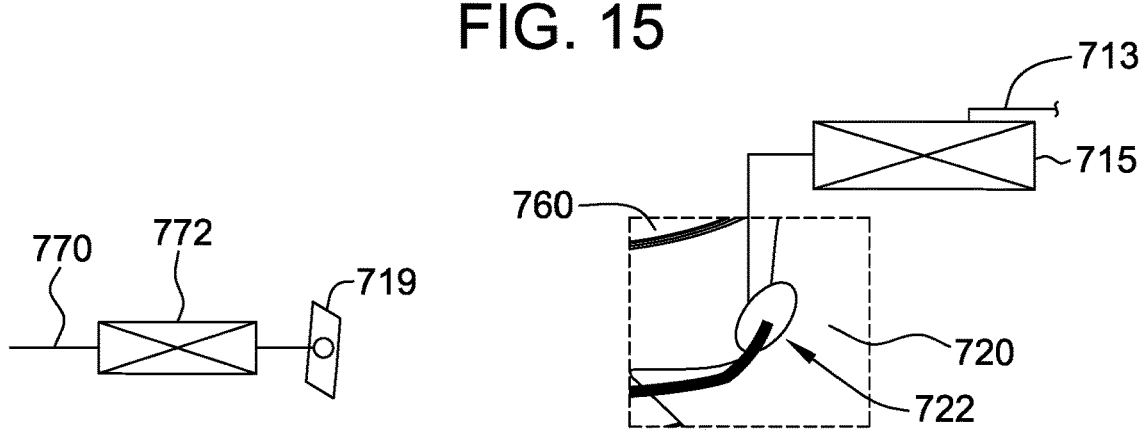
FIG. 15B
FIG. 15A

ASSEMBLY BLOWER AND ASSOCIATED METHOD

CROSS REFERENCE TO RELATED APPLICATION

This application is a continuation-in-part non-provisional application and claims priority to U.S. Utility patent application Ser. No. 14/639,167 filed Mar. 5, 2015 for "ASSEMBLY, BLOWER and ASSOCIATED METHOD" and published as US 2016/0258438 A1 on Sep. 8, 2016, which is hereby incorporated by reference in its entirety.

BACKGROUND OF THE INVENTION

The embodiments described herein relate generally to fluid moving devices, and more specifically, to a blower for moving air and to a pump for moving water.

Blowers consist of a moving element(s), for example a blade(s) that moves within a confined space, for example a furnace or within an air duct. The size, attitude and shape of the blade(s), as well as, the size and shape of the confined space effects the volume of air that a blower provides. The size, attitude and shape of the blade(s), as well as, the size and shape of the confined space also effects the efficiency of the blower.

For a single speed blower motor the efficiency of the blower may be optimized by providing an optimized fixed position of the blades on the wheel and an optimized fixed size and shape of the confined space. For multiple speed motors, for example for modern electronically commutated motors (ECM), a single configuration of blades or of the confined shape will not be optimum of all of the available speeds and air flows that the blower with the multiple speed motor may provide.

Other fluid moving devices move a liquid, for example water. Such liquid moving devices include pool and spa pumps that include rotating members in the form of impellers that moves within a confined space, for example within the housing of the pump. The size, attitude and shape of the impeller(s), as well as, the size and shape of the confined space of the pump housing effects the volume of water that a pump provides. The size, attitude and shape of the impeller (s), as well as, the size and shape of the confined space also effects the efficiency of the pump.

Fluid moving devices, including for example air moving devices, such as blowers, and liquid moving devices, such as pumps, typically provide fluid flow. Fluid flow is volumetric and includes fluctuations due to density, velocity and pressure.

For a single speed pump motor, the efficiency of the pump may be optimized by providing an optimized fixed position of the impellers on the pump and an optimized fixed size and shape of the pump housing. For multiple speed motors, for example for modern electronically commutated motors (ECM), a single configuration of pump impellers or of the pump housing will not be optimum of all of the available speeds and fluid flows that the pump with the multiple speed motor may provide.

The present invention is directed to alleviate at least some of these problems with the prior art.

BRIEF DESCRIPTION OF THE INVENTION

According to an embodiment of the invention, an assembly having a moveable surface adapted to advance the flow of fluid in a fluid flow device is provided. The assembly includes a body and a member moveably secured to the body. The assembly also includes a motion device secured to the body and adapted to move the member relative to the body.

According to an aspect of the invention, the body includes a blower housing and the member includes a wall of the blower housing.

According to another aspect of the invention, the assembly also includes a controller for controlling the motion device.

According to yet another aspect of the invention, the assembly is configured such that the controller is adapted to move the member relative to the body in response to changing operating conditions including at least one of air flow, temperature, pressure and turbulence.

According to another aspect of the invention, the assembly is configured such that the body includes a blower wheel and such that the member includes a blade.

According to another aspect of the invention, the assembly is configured such that the body includes a blade body or fan body and such that the member includes a blade.

According to another aspect of the invention, the assembly is configured such that the motion device includes a servo motor.

According to another aspect of the invention, the assembly is configured such that the motion device includes a shape memory alloy wire.

According to another aspect of the invention, the assembly also includes a second member moveably secured to the body and spaced from the first member. The first member and the second member are connected to an intermediate member.

According to another aspect of the invention, the assembly is configured such that the body includes a housing and such that the member includes a dampener vane.

According to another embodiment of the invention, a blower having a moveable member adapted to influence the flow of air through the blower is provided. The blower includes a body and a member moveably secured to the body. The blower also includes a motion device secured to the body and adapted to move the member relative to the body.

According to an aspect of the invention, the blower is configured such that the body includes a blower housing and such that the member includes a wall of the blower housing.

According to another aspect of the invention, the blower is configured such that the wall is made of a flexible material.

According to yet another aspect of the invention, the blower is configured such that the body includes a blower wheel and such that the member includes a vane.

According to another aspect of the invention, the blower is configured such that the motion device includes a servo motor.

According to another aspect of the invention, the blower is configured such that the motion device includes a shape memory alloy wire.

According to another aspect of the invention, the blower further includes a controller for controlling the motion device.

According to another aspect of the invention, the blower is configured such that the controller is adapted to move the member relative to the body in response to changing operating conditions including at least one of air flow, temperature, pressure and turbulence.

According to another aspect of the invention, the blower is configured such that the body includes a blower wheel and such that the member includes a blade. The blower further includes a second vane moveably secured to the blower wheel and spaced from the first vane. The first vane and the second vane are connected to an intermediate member. The intermediate member is connected to the motion device.

According to yet another embodiment of the invention, a method for altering the flow of air in a blower is provided. The method includes the steps of providing a body, providing a member, moveably securing the member to the body, providing a motion device and moving the member relative to the body with the motion device.

According to another aspect of the invention, the method further includes the steps of providing a controller for controlling the motion device, measuring at least one of temperature, air flow, turbulence and pressure, and moving the member relative to the body with the motion device in response to changes in at least one of temperature, air flow, turbulence and pressure.

According to another aspect of the invention, a blower assembly for advancing the flow of air in an air flow device at a selected one of a plurality of air flow rates is provided. The blower assembly includes a blower housing defining a body thereof and a wall of the blower housing moveably secured to the body. The blower assembly further includes a motion device secured to the body and to the wall. The motion device moves the wall relative to the body to a selected one of a plurality of distinct wall positions.

The blower assembly also includes a blower wheel rotatably mounted to the blower housing and a motor for rotating the blower wheel at a selected one of a plurality of rotational speeds. Each combination of the selected one of the plurality of selectable rotational speeds and the selected one of the plurality of distinct wall positions defines an energy usage rate for the motor. Each combination of the one of the plurality of distinct wall positions and the one of the plurality of selectable rotational speeds defines an air flow output of the blower.

The blower assembly also includes a controller connected to the motor and to the motion device. The controller includes a signaling device for transmitting an air flow signal to the controller to command the blower assembly to operate at the selected one of a plurality of air flow rates. The controller calculates a combination of one optimum wall position and one optimum rotational speed to provide for minimal energy usage rate at that selected one of a plurality of air flow rates. The controller sends a wall position signal to the motion device to move the wall to the optimum wall position and sends a rotational speed signal to the motor to rotate the blower at the optimum rotational speed.

According to another aspect of the invention, the blower assembly may be configured such that the motor is an ECM motor.

According to another aspect of the invention, the blower assembly may be configured such that the wall of the blower housing moveably secured to the body is pivotally connected to the body.

According to another aspect of the invention, the blower assembly may be configured such that the blower wheel includes a wheel body and a first blade connected to the wheel body.

According to another aspect of the invention, the blower assembly may be configured such that the wheel body includes a second blade connected to the wheel body.

According to another aspect of the invention, the blower assembly may be configured such that the first blade and the second blade are rotatably positioned with respect to the wheel body.

According to another aspect of the invention, the blower assembly may further include an angular orientation device connected to the first blade, to second blade and to the wheel body for angularly orienting the first blade and the second blade relative to the wheel body to one of a plurality of blade angular positions relative to the wheel body According to another aspect of the invention, the blower assembly may be configured such that the controller is connected to the angular orientation device. The controller calculates a combination of one optimum wall position, one optimum blade angular position and one optimum rotational speed to provide for minimal energy usage rate at that selected one of a plurality of air flow rates.

The controller sends a blade angular position signal to the angular orientation device to move the first blade and the second blade relative to the optimum blade angular position relative to the wheel body. The controller sends a wall position signal to the motion device to move the wall to the optimum wall position and sends a rotational speeds signal to the motor to rotate the blower at the optimum rotational speed.

According to another aspect of the invention, the blower assembly may be configured such that the motion device includes a servo motor.

According to another aspect of the invention, the blower assembly may be configured such that the blower assembly includes a shape memory alloy wire.

According to another aspect of the invention, the blower assembly further includes a dampener vane moveably oriented with respect to the blower housing and a vane orientation device for orienting the dampener vane with respect to the blower housing to one of a plurality of dampener vane positions relative to the blower housing.

According to another aspect of the invention, the blower assembly may be configured such that the controller is connected to the vane orientation device. The controller calculates a combination of one optimum wall position, one optimum dampener vane position and one optimum rotational speed to provide for minimal energy usage rate at that selected one of a plurality of air flow rates. The controller sends a dampener vane position signal to the vane orientation device to move the dampener vane to the optimum dampener vane position. The controller also sends a wall position signal to the motion device to move the wall to the optimum wall position. The controller also sends a rotational speed signal to the motor to rotate the blower at the optimum rotational speed.

According to another aspect of the invention, a device for advancing the flow of fluid in a fluid flow device at a selected one of a plurality of fluid flow rates is provided. The device includes a housing defining a body thereof and a wall of the housing moveably secured to the body.

The device also includes a motion device secured to the body and to the wall. The motion device moves the wall relative to the body to a selected one of a plurality of distinct wall positions.

The device also includes a fluid moving member rotatably mounted to the housing and a motor for rotating the fluid moving member at a selected one of a plurality of rotational speeds. Each combination of the selected one of the plurality of selectable rotational speeds and the selected one of the plurality of distinct wall positions defines an energy usage rate for the motor. Each combination of the one of the plurality of distinct wall positions and the one of the plurality of selectable rotational speeds defines a fluid flow out of the device.

The device also includes a plurality of blades rotatably positioned with respect to the fluid moving member and an angular orientation device connected to the plurality of blades and to the fluid moving member for angularly orienting the plurality of blades relative to the fluid moving member to one of a plurality of blade angular positions relative to the fluid moving member.

The device also includes a controller connected to the motor, to the motion device and to the angular orientation device. The controller includes a signaling device for transmitting a fluid flow signal to the controller to command the device to operate at the selected one of a plurality of fluid flow rates. The controller calculates a combination of one optimum wall position, one optimum rotational speed, one optimum blade angular position and one optimum blade angular position to provide for minimal energy usage rate at that selected one of a plurality of fluid flow rates. The controller sends a wall position signal to the motion device to move the wall to the optimum wall position and sends a rotational speed signal to the motor to rotate the fluid moving member at the optimum rotational speed. The controller further sends an angular orientation signal to the angular orientation device to rotate the plurality of blades at the optimum angular orientation.

According to another aspect of the invention, the device may be configured such that the fluid is air.

According to another aspect of the invention, the device may be configured such that the fluid is water.

According to another aspect of the invention, the device may be configured such that the wall is made of a flexible material.

According to another aspect of the invention, the device may be configured such that the device further includes a dampener vane moveably oriented with respect to the housing and a vane orientation device for orienting the dampener vane with respect to the housing to one of a plurality of dampener vane positions relative to the housing.

According to another aspect of the invention, the device may be configured such that the controller is connected to the vane orientation device. The controller calculates a combination of one optimum wall position, one optimum dampener vane position, one optimum rotational speed and one optimum blade angular position to provide for minimal energy usage rate at that selected one of a plurality of fluid flow rates. The controller sends a dampener vane position signal to the vane orientation device to move the dampener vane to the optimum dampener vane position and sending a wall position signal to the motion device to move the wall to the optimum wall position. The controller also sends an angular orientation signal to the angular orientation device to rotate the plurality of blades at the optimum angular orientation and sends a rotational speeds signal to the motor to rotate the fluid moving member at the optimum rotational speed.

According to another aspect of the invention, the device may be configured such that the controller adjusts the rotational speed, moves at least one of the wall relative to the body, moves the plurality of blades relative to the fluid moving member and moves the dampener vane relative to the housing in response to changing operating conditions including at least one of fluid flow, temperature, pressure and turbulence to provide for minimal energy usage rate.

According to another aspect of the invention, the device may be configured such that the motion device includes a servo motor.

According to another aspect of the invention, the device may be configured such that the motion device includes a shape memory alloy wire.

According to another aspect of the invention, the device may be configured such that the motor includes an ECM motor.

According to another aspect of the invention, the device may be configured such that the controller is adapted to move at either the wall relative to the body and the plurality of blades relative to the fluid moving member, or both, in response to changing operating conditions including at least one of fluid flow, temperature, pressure and turbulence to provide for minimal energy usage rate.

According to another aspect of the invention, a method for advancing the flow of fluid in a fluid flow device at a selected one of a plurality of fluid flow rates is provided. The method includes the steps of providing a housing defining a body thereof and moveably securing a wall of the housing to the body to one of a selectable plurality of positions relative to the body. The method includes the steps of providing a motion device, securing the motion device to the body and to the wall at a plurality of wall positions and rotatably mounting a fluid moving member to the housing.

The method also includes the steps of providing a motor for rotating the fluid moving member at a plurality of rotational speeds, providing a controller and connecting the controller to the motor and to the wall.

The method also includes the steps of defining an energy usage rate for the motor for each combination of rotational speeds and wall position wall positions defining an energy usage rate for the motor and transmitting a fluid flow signal to the controller to command the fluid flow device to operate at the selected one of a plurality of fluid flow rates.

The method also includes the steps of utilizing the controller to calculate a combination of one optimum wall position and one optimum rotational speed to provide for minimal energy usage rate at that selected one of a plurality of fluid flow rates.

The method also includes the steps of sending a wall position signal to the motion device to move the wall and sending a rotational speeds signal to the motor to rotate the fluid moving member at the optimum rotational speed.

BRIEF DESCRIPTION OF THE DRAWINGS

FIG. 8 is a perspective view of an embodiment of the present invention in the form of a squirrel cage fan or blower with a moveable vane in the outlet duct;

FIG. 8B is a partial enlarged view of the blower wheel of FIG. 8 showing the first vane being pivoted by an actuator wire;

FIG. 9 is a plan view of an embodiment of the present invention in the form of a fan having a moveable blade;

FIG. 9A is a partial enlarged view of the fan of FIG. 9 showing the moveable blade in greater detail;

FIG. 15 is a plan view, partially in cross section, of an embodiment of the present invention in the form of a moveable fan blade and a moveable damper vane positioned in the outdoor HVAC unit of FIG. 14;

FIG. 15A is a partial enlarged view of a fan blade of the outdoor HVAC unit of FIGS. 14-15 utilizing an actuation wire;

FIG. 15B is a partial enlarged view of a moveable damper vane of the outdoor HVAC unit of FIGS. 14-15 utilizing an actuation wire;

DETAILED DESCRIPTION OF THE INVENTION

Fluid moving devices typically include moving, typically rotating, members or elements moved by a power source, typically an electric motor. The fluid may be a liquid, for example water, or a gas, for example fluid.

Liquid moving devices include pool and spa pumps that include rotating elements or blades in the form of impellers that moves within a confined space, for example within the housing of the pump. The size, attitude and shape of the impeller(s), as well as the size and shape of the confined space of the pump housing, effects the volume of water that a pump provides. The size, attitude and shape of the impeller(s), as well as, the size and shape of the confined space also effect the efficiency of the pump.

For a single speed pump motor, the efficiency of the pump may be optimized by providing an optimized fixed position of the impellers on the pump and an optimized fixed size and shape of the pump housing. For multiple speed motors, for example for modern electronically commutated motors (ECM), a single configuration of pump impellers or of the pump housing will not be optimum of all of the available speeds and fluid flows that the pump with the multiple speed motor may provide.

Gas moving devices are in many forms and are used to move a variety of gases. One such gas is air and the air is typically moved by elements or members that are located in blowers or fans.

Blowers and fans consist of a moving element(s), for example a blower wheel element(s) or a fan blade(s), respectively, that moves within a confined space, for example a furnace or within an air duct. The size, attitude and shape of the element(s) or blade(s), as well as, the size and shape of the confined space effect the volume of air that a blower provides. The size, attitude and shape of the element(s) or blade(s), as well as, the size and shape of the confined space also effect the efficiency of the blower.

For a single speed blower motor the efficiency of the blower may be optimized by providing an optimized fixed position of the elements or blades on the wheel or fan and an optimized fixed size and shape of the confined space. For multiple speed motors, for example for modern electronically commutated motors (ECM), a single configuration of elements or blades or of the confined shape will not be optimum of all of the available speeds and air flows that the fan or blower with the multiple speed motor may provide.

Figure 1:
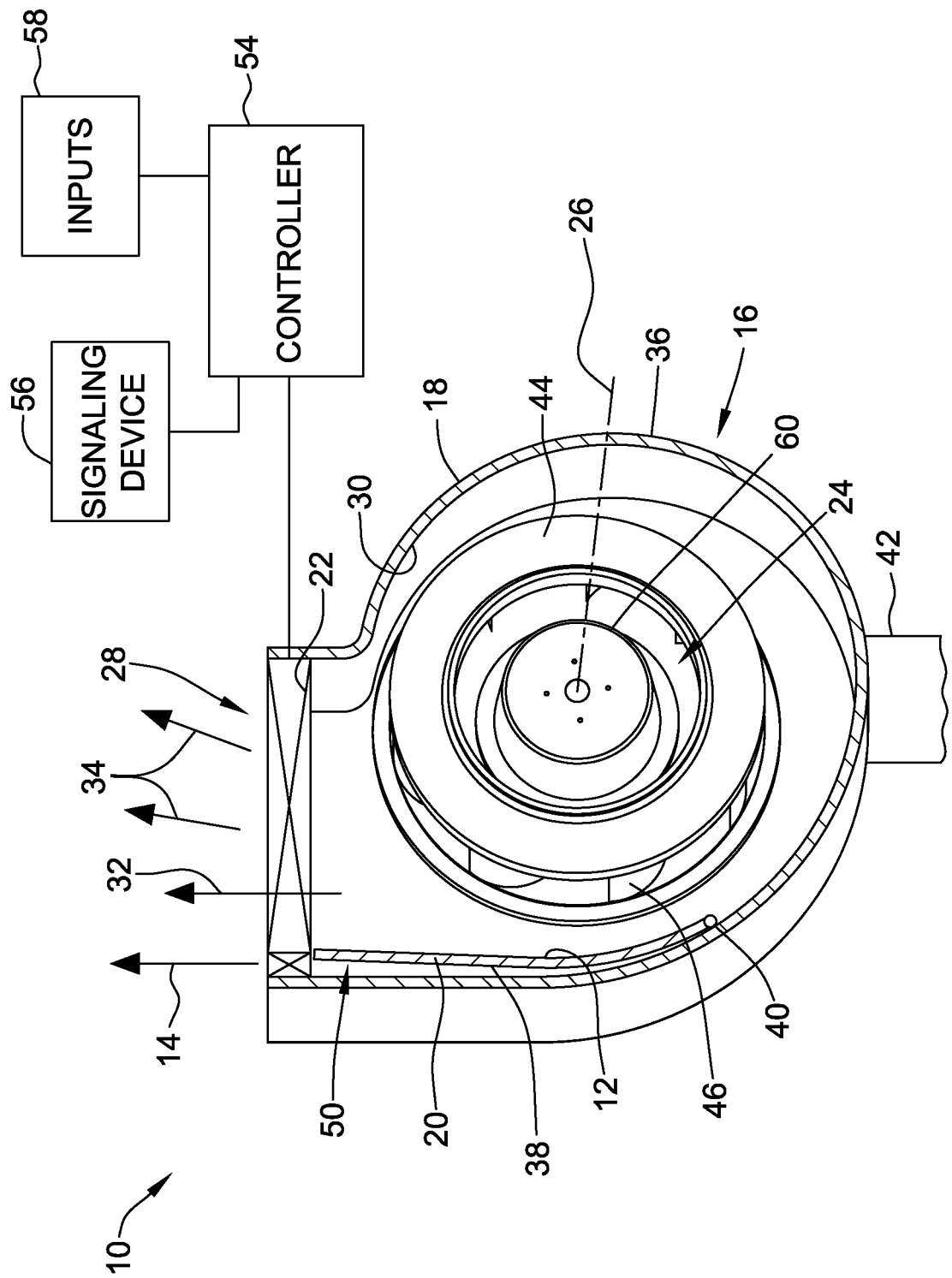
FIG. 1 is a plan view, partially in cross section, of an embodiment of the present invention in the form of a configurable blower having a blower housing with a moveable wall.
Figure 2:
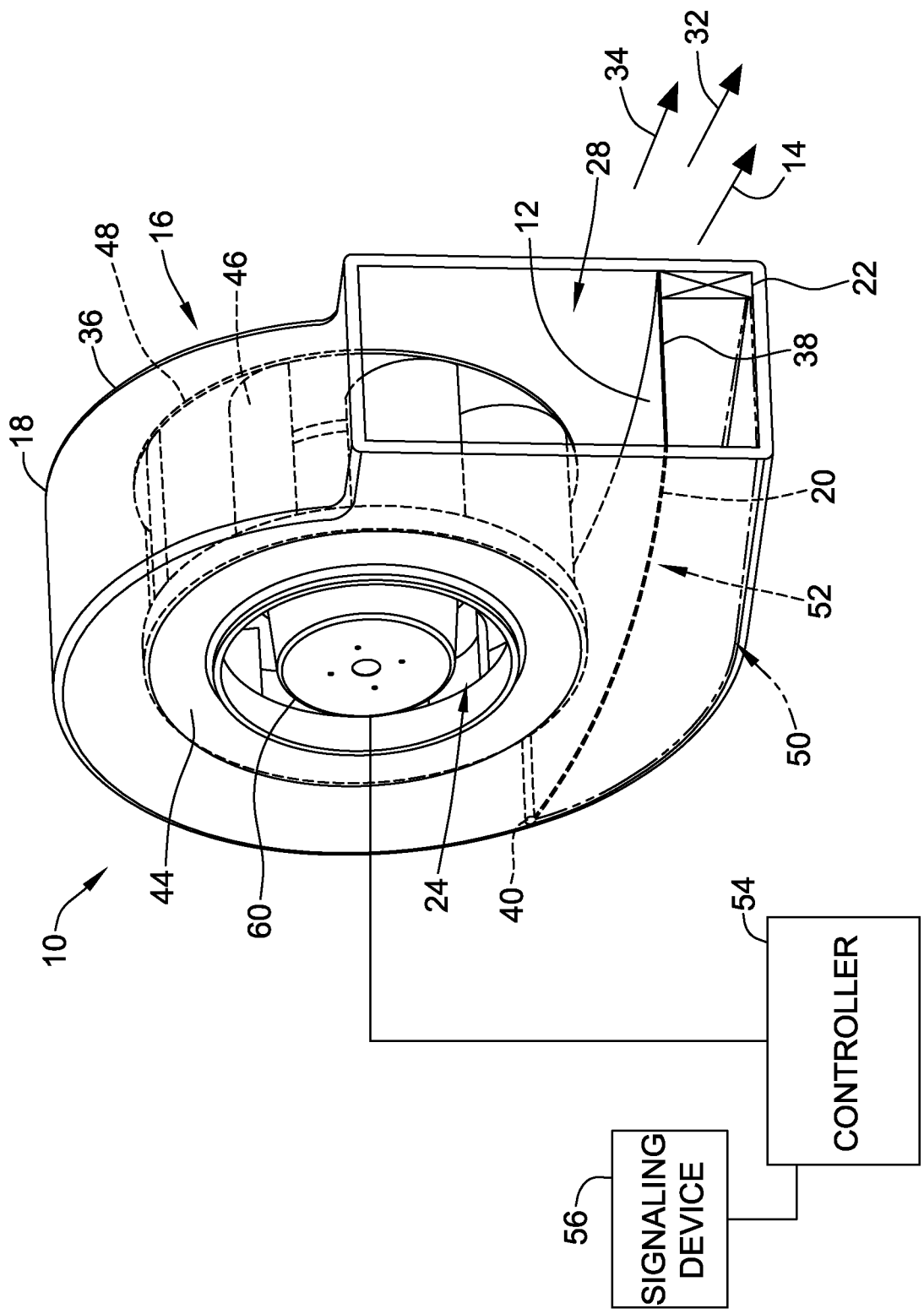
FIG. 2 is a perspective view of the blower of FIG. 1.

According to an embodiment of the present invention and referring to FIGS. 1 and 2, an assembly 10 having a moveable surface 12 adapted to advance the flow of fluid 14 in a fluid flow device 16 is provided. The assembly 10 includes a body 18 and a member 20 moveably secured to the body 18. The assembly 10 also includes a motion device 22 secured to the body 18 and adapted to move the member 20 relative to the body 18.

The fluid flow device 16 may be any device that provides for the flow of a fluid. For example, the fluid flow device 16 may be a liquid pump or, as shown in the embodiment of FIGS. 1 and 2, an air flow device. As an air flow device, the device 16 may be in the form of a fan or, as shown, as blower 16. The blower 16 includes the assembly 10.

The body 18 may have any suitable size and shape and may be designed to accommodate the blower 16. For a cylindrical squirrel cage or generally cylindrically shaped blower 16, the body 18 typically is generally cylindrical and defines an inlet 24 positional centrally along rotational axis 26 of the blower 16. The body 18 typically further defines an outlet 28 extending outwardly from periphery 30 of the body, typically in a spirally extending fashion. The blower 16 serves to advance air flow 32 in the direction of arrows 34 from inlet 24 to outlet 28. The body 18 may be made of any suitable materials and may, for example, be made of a polymer, a metal or a composite. The body 18 may be cast, molded fabricated or welded, or a combination thereof.

The member 20 may be any member capable of modifying the air flow 32. The member 20 may have any suitable size and shape. The member 20 may be made of any suitable materials and may, for example, be made of a polymer, a metal or a composite. The member 20 may be cast, molded fabricated or welded, or a combination thereof.

The motion device 22 may be any device capable of moving the member 20. The motion device 20 may have any suitable size and shape. The motion device 20 may be made of any suitable materials and may, for example, be made of a polymer, a metal or a composite. The motion device 20 may be cast, molded fabricated or welded, or a combination thereof.

As shown in the embodiment of FIGS. 1 and 2, the body 18 includes a blower housing 36 and the member 20 includes a wall 38 of the blower housing 24. The wall 38 may be integral with the housing 36 or may be a separate component. The wall 38 may be connected to the housing 36 by, for example, a hinge 40 which may be a living hinge.

Similar to the body 18, the blower housing 36 may be made of any suitable materials and may, for example, be made of a polymer, a metal or a composite. The blower housing 36 may be cast, molded fabricated or welded, or a combination thereof. The blower housing 36 may be secured to assembly 10 at, for example, assembly frame 42.

The blower 16 may include generally cylindrical body or blower frame 44 to which one or more blades or fins 46 are secured, typically equally spaced about periphery 48 of the frame 44.

As shown in FIG. 1, the member 20, that may for example include or be in the form of wall 38 that extends from hinge 40 and may be a separate component or integral with housing 36. The wall 38 may be made from any suitable, durable material. For example, the wall 38 may be made from a polymer, a composite or a metal. The wall 38 may have any suitable shape and may as shown be generally rectangular and generally sheet-like and arcuate.

The wall 38 may, as shown in FIG. 2, may be moveable from a first or open position 50 shown as a phantom line to a second or closed position 52 shown in solid. As shown in FIG. 2, the wall 38, when in closed position 52, is closely conforming to blades 46 of the squirrel cage fan 16. As shown in FIG. 1, the wall 38, when in open position 50, is spaced from blades 46 of the squirrel cage fan 16. Air flow 32 from the fan 16 adjacent the outlet 28 may be varied by moving the wall from the open position 50 to the closed position 52 and back.

While, as shown, a pivoting, hinged arrangement for moveably positioning the wall 38 onto the housing 36 may be used, it should be appreciated that other arrangements may be used to provide a moveable wall. For example, the wall may extend outwardly as a drawer face along drawer guide rails, not shown, or the wall may be flexible and/or expandable and be moved outwardly by, for example, air pressure.

The wall 38 is moved by motion device 22. The motion device may be any device capable of moving the wall. The motion device 22 may manually move the wall or do so under power and/or remotely. It should be appreciated that the motion device may be merely capable of positioning the wall 38 in either the open position 50 or the closed position 52. Such a motion device may be in the form of a solenoid. Preferably the motion device 22 may be used to selectively position the wall 38 in any desired position from the open position 50 to the closed position 52. The motion device may, as shown, be an electric motor or a servo 22 which may be configured to so selectively position the wall 38.

To selectively position the wall and according to another aspect of the invention, the assembly 10 may further include a controller 54 for controlling the motion device 22. The controller may be any device capable of sending signals, either by hard wiring or wirelessly to the motion device 22. The controller 54 may receive signals, either by hard wiring or wirelessly, from a signaling device 56 in the form of, for example, a master controller, an input/output device or a smart device, for example an, I-Phone, an android phone, a laptop or a notebook.

According to yet another aspect of the invention, the assembly 10 may be configured such that the controller 54 is adapted to move the member 20 or wall 38 relative to the body or housing 40 in response to inputs 58 including, for example changing operating conditions 58. Such changing operating conditions may include at least one of air flow, temperature, pressure and turbulence.

As shown in FIG. 1, the squirrel cage fan or blower 16 may be rotated by, for example an electric motor 60. The electric motor 60 may be any motor capable of rotating the blower 16 and may for example be a constant speed motor or a variable speed motor. The motor 60 may, for example, be an induction motor, a permanent magnet motor, a switched reluctance motor or an Electronically Commutated motor (ECM).

Figure 3:
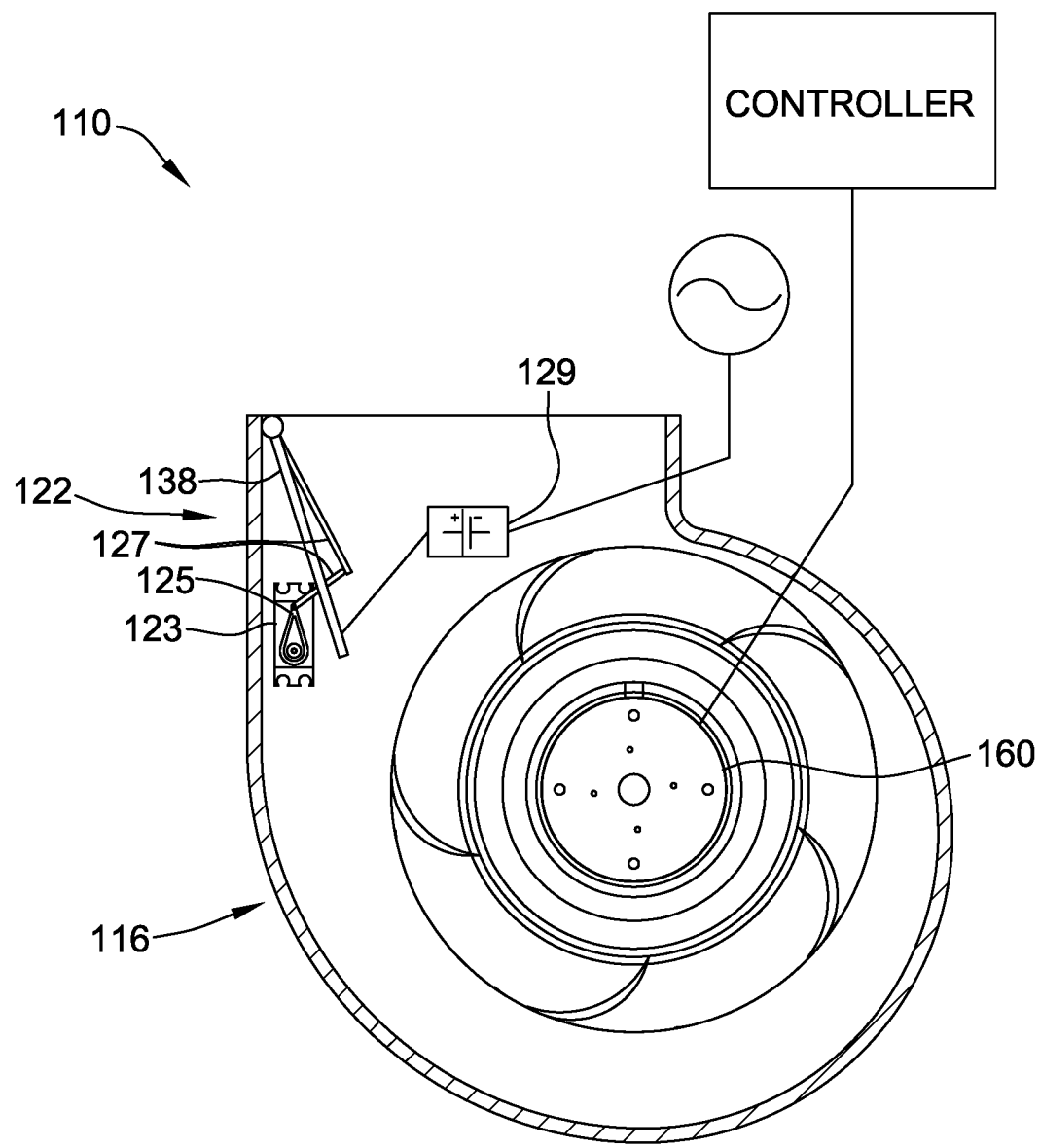
FIG. 3 is a plan view, partially in cross section, of an embodiment of the present invention in the form of a configurable blower with a servo and associated linkage.
Figure 4:
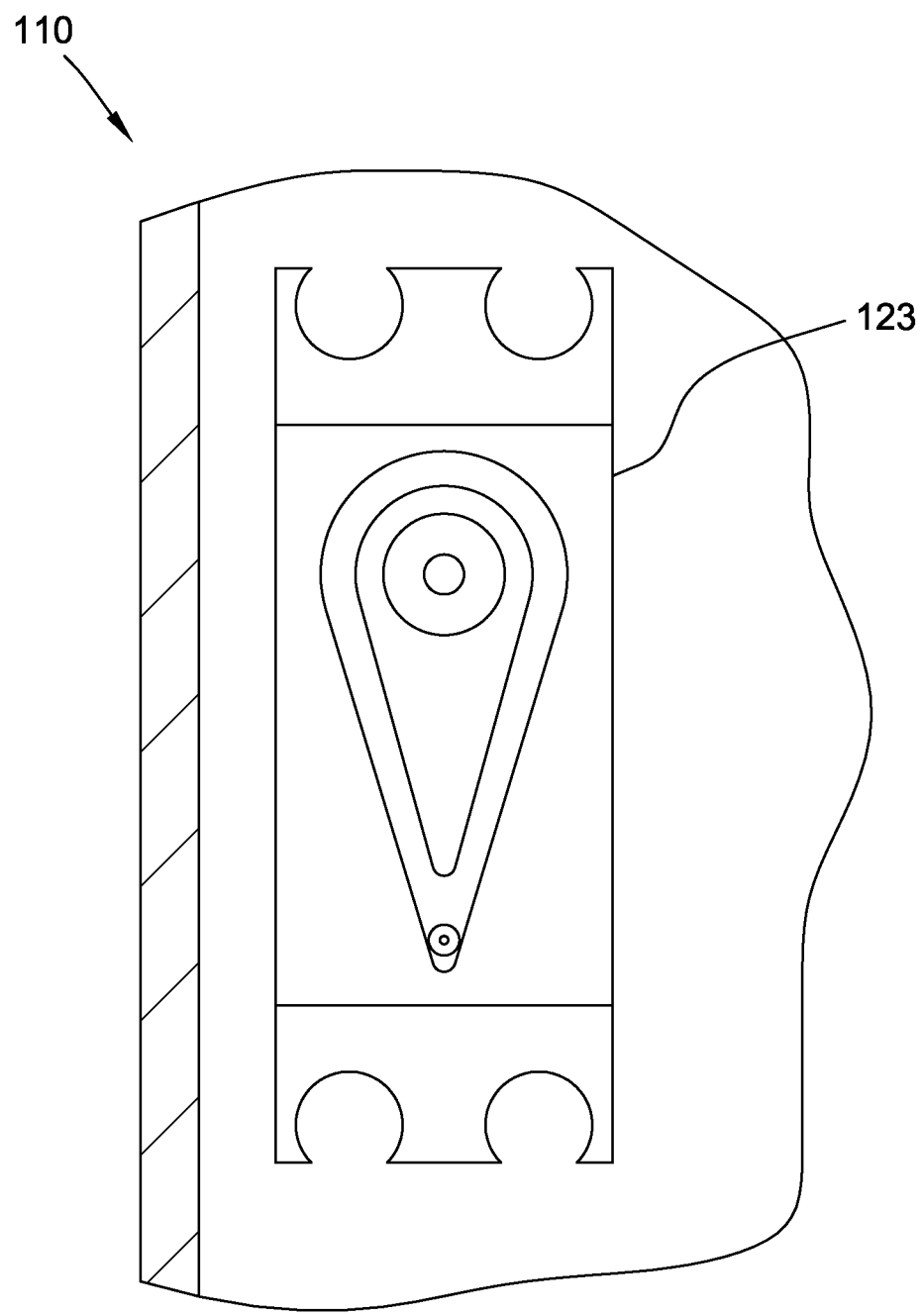
FIG. 4 is a plan view of a servo for use in the blower of FIG. 3.

According to another embodiment of the present invention and referring to FIG. 3 and FIG. 4, assembly 110 is shown. The assembly 110 is similar to assembly 10 of FIG. 1 and FIG. 2 and includes a squirrel cage blower 116 similar to blower 16 of the assembly 10. The blower 116 is driven by motor 160 similar to motor 60 of FIG. 1. The blower 116 includes a moveable wall 138 similar to wall 36 of FIG. 1 and is moved by motion device 122.

The motion device 122 includes a servo motor 123. The servo motor 123 include an arm 125 which is connected to a linkage 127. The linkage 127 is connected to the wall 138 to move the wall 138. As shown the motion device 122 is connected to a battery 129 that serves to power the motion device 122.

Referring now to FIG. 4, the servo motor 223 is shown in greater detail. The servo motor 223 may be a radio-controlled hobby type servo motor.

Figure 5:
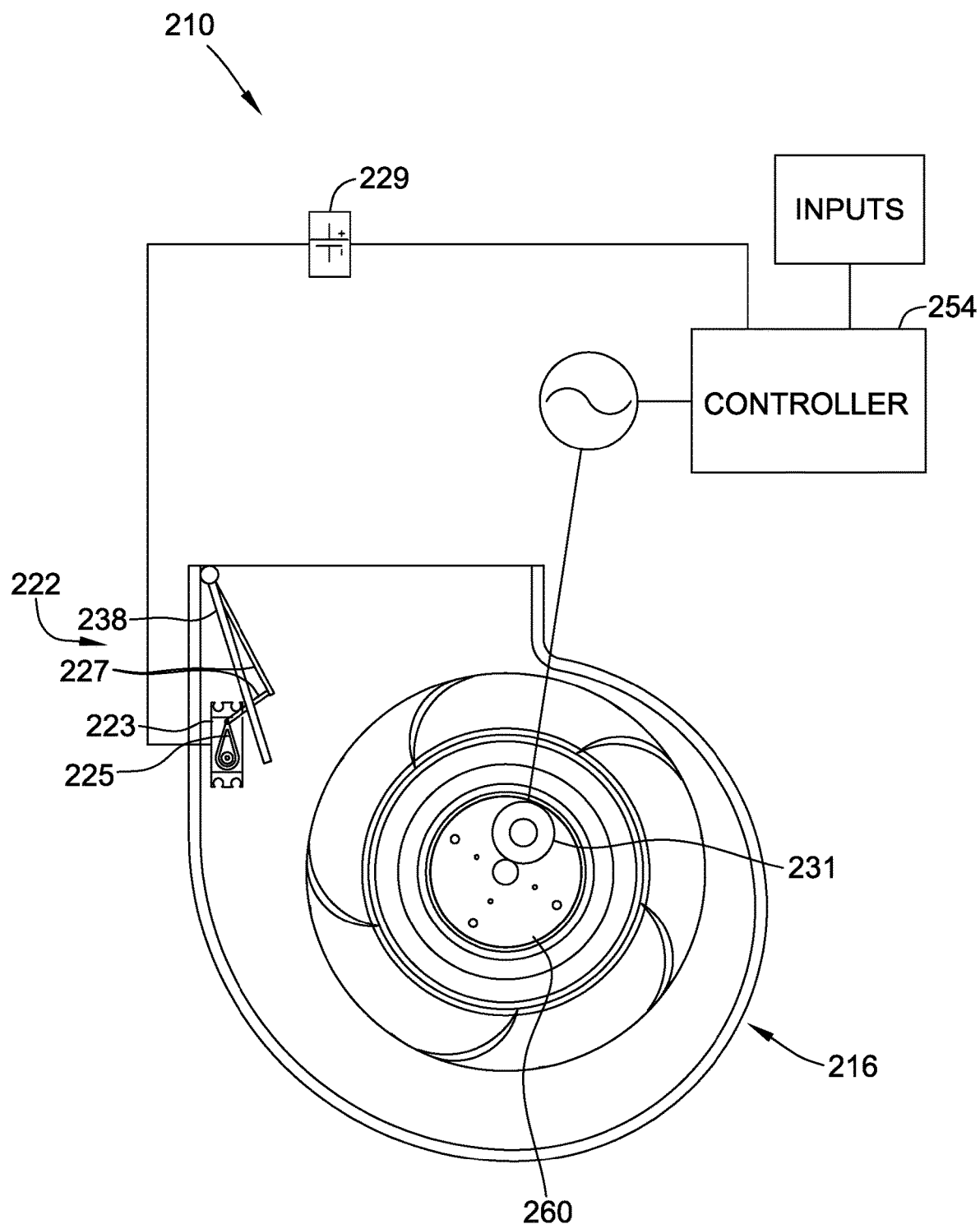
FIG. 5 is a plan view, partially in cross section, of an embodiment of the present invention in the form of a configurable blower with a generator for generating energy to control the moveable components of the configurable blower.

According to another embodiment of the present invention and referring now to FIG. 5, assembly 210 is shown. The assembly 210 is similar to assembly 10 of FIG. 1 and includes a squirrel cage blower 216 similar to blower 16 of the assembly 10. The blower 216 is driven by motor 260 similar to motor 60 of FIG. 1. The blower 216 includes a moveable wall 238 similar to wall 38 of FIG. 1 and is moved by motion device 222.

The motion device 222 includes a servo motor 223. The servo motor 223 includes an arm 225 which is connected to a linkage 227. The linkage 227 is connected to the wall 238 to move the wall 238. As shown the motion device 222 is connected to a battery 229 that serves to power the motion device 222. As shown the blower is connected to a generator 231 that provides electricity to controller 254, similar to controller 54 of FIG. 1. Electricity from the controller 254 is sent to the battery 229 to keep it fully charged.

Figure 6:
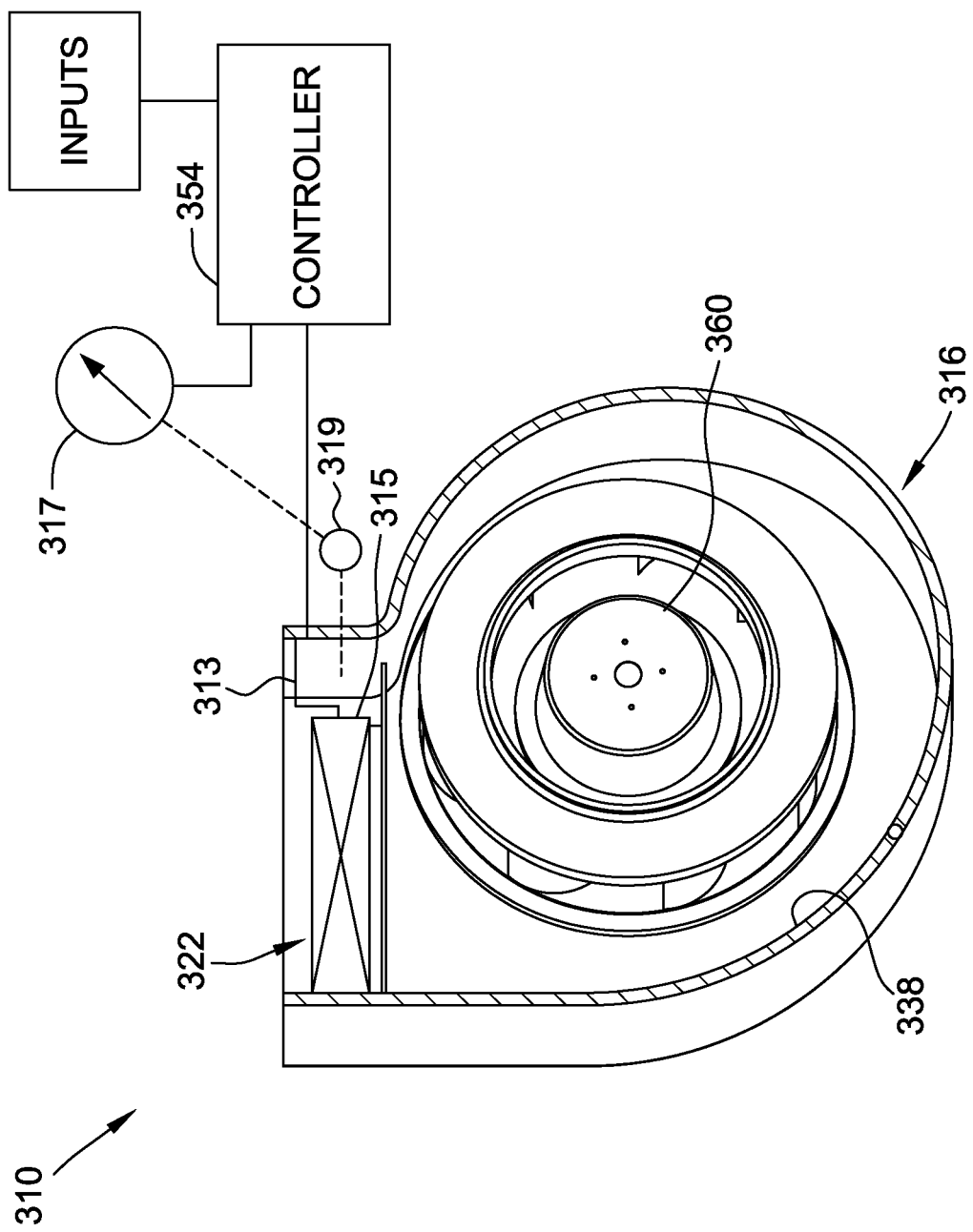
FIG. 6 is a plan view, partially in cross section, of an embodiment of the present invention in the form of a flow chamber having a moveable wall in a first position, moveable by a shape memory alloy wire.

According to another embodiment of the present invention and referring now to FIG. 6, assembly 310 is shown. The assembly 310 is similar to assembly 10 of FIG. 1 and may include a squirrel cage blower 316 similar to blower 16 of the assembly 10. The blower 316 is driven by motor 360 similar to motor 60 of FIG. 1. The blower 316 includes a moveable wall 338 similar to wall 38 of FIG. 1 and is moved by motion device 322.

The motion device 322 is different than the motion device 122 of assembly 110. The motion device 322 includes a shaped memory alloy actuator wire 313. The wire 313, when exposed to an electrical current, contracts. This contraction is in the order of magnitude of 3 to 4 percent of its length and thus provides for a stroke or movement of the wire of around 3 to 4 percent of the wire's length. The wire thus typically may need a device attached to the wire 313 to multiply the stroke it can provide so that it may effectively move the wall 338 sufficiently. For example, and as shown the motion device 322 may further include a multiplier 315.

The multiplier 315 may be any mechanical device capable of multiplying the movement provided by the wire 313. For example, the multiplier may be a normal bias spring, a dead weight bias, a leaf spring bias, a right angle pull, a simple lever, an adjusting curvature, and a clam shell. The multiplier 315 may be attached to the wire to increase the motion provided by the wire 313.

The wire 313 may be electrically connected to power source 317 either directly through a switch 319 or, as shown, through controller 354, similar to controller 54 of apparatus 10 as shown in FIG. 1.

The wire 313 is a shaped memory alloy actuator wire. The shaped memory alloy actuator wire may be available as a Flexinol® actuator wire, Such Flexinol® actuator wires are available from Dynalloy, Inc. 1562 Reynolds Avenue, Irvine, Calif. 92614.

The multiplier 315 may be any mechanical device and such devices are described in greater detail in a publication titled "Technical Characteristics of Flexinol® Actuator Wires", F1140 Rev 1.2, available from Dynalloy, Inc. 1562 Reynolds Avenue, Irvine, Calif. 92614 and available online at http://www.dynalloy.com, hereby incorporated in its entirety by reference.

Figures 7, 8A:
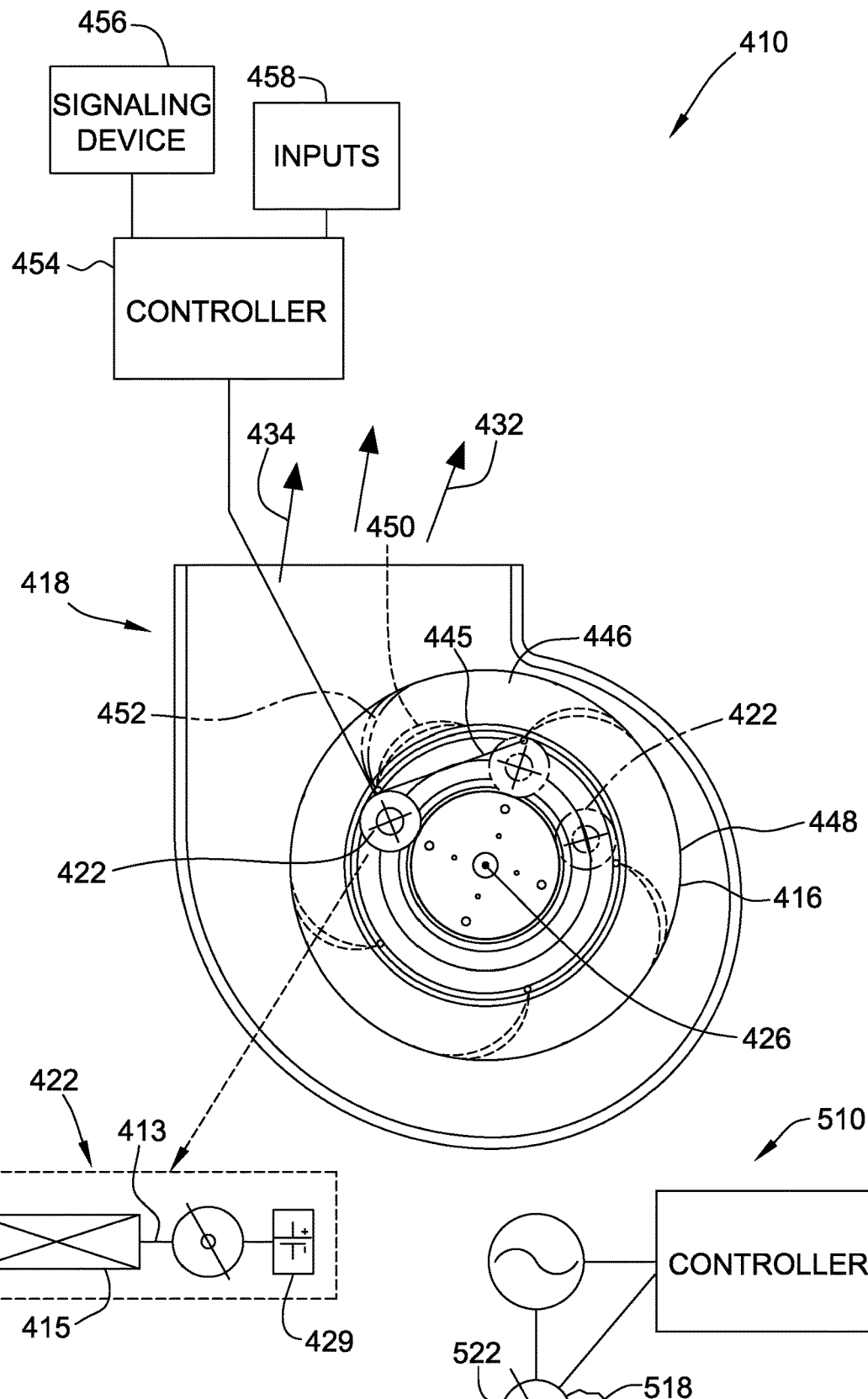
FIG. 7 is a plan view, partially in cross section, of an embodiment of the present invention in the form of a squirrel cage fan or blower with a moveable blade.
FIG. 8A is a partial enlarged view of the blower wheel of FIG. 8, showing the moveable blade in greater detail.

According to another embodiment of the invention and referring now to FIG. 7, assembly 410 is shown. The assembly 410 includes a body 418 in the form of a squirrel cage fan 416. A moveable member 416 in the form of a first fin or blade 446 is moveably positioned on periphery 448 of the body 418.

The fin or blade 446 may be moveable from a first or tangential position 450 (shown as a dashed line) aligned with periphery 448 of the body 418 to a second or radial position 452 (shown as a phantom line) extending radially outward from axis 426 of fan 416. Air flow 432 from the fan 416 may be varied by pivoting the blade 446 from the open position 450 to the closed position 452 and back.

The blade 446 may be pivoted in any suitable manner. For example, and as shown in FIG. 7, a pivoting device 422 in the form of a motor or, as shown, a servo is mounted to the periphery 448 of the fan 416. The blade 446 is mounted to the servo 422 which rotates the blade 446. A battery 429 may be used to provide power to the servo 422.

While a single, pivoting blade arrangement for moveably positioning a single blade may be used, it should be appreciated and, as shown, other arrangements including multiple, pivoting, spaced apart, blades may be used. For example, additional pivoting blades 446, (shown as dashed lines) may each be positioned on periphery 448 of the body 418.

The additional pivoting blades 446 may be pivoted in any suitable manner. For example, and as shown adjacent blades 446 are connected at their periphery by links 445. When the servo 422 which rotates the blade 446 is energized, the adjacent blades 446 are pivoted by the links connected to the blade rotated by the servo 422.

Alternately, each blade 446 may have its own servo 422 as shown in phantom.

Alternately, the first blade 446 may be pivoted by the use of an actuator wire 413, similar to wire 313 of the assembly 310 of FIG. 6. The stroke of the wire 413 may be multiplied by multiplier 415, similar to multiplier 315 of the assembly 310 of FIG. 6. The additional blades 446 may either be connected by links 445 or each blade may be connected to a wire 413 and a multiplier 415.

To selectively position the blades 446 and according to another aspect of the invention, the assembly 410 may further include a controller 454 for controlling the blades 446. The controller 454 may be any device capable of sending signals, either by hard wiring or wirelessly to the servo 422 or to the wire 413. The controller 454 may receive signals, either by hard wiring or wirelessly, from a signaling device 456 in the form of, for example, a master controller, an input/output device or a smart device, for example an, 1-Phone, an android phone, a laptop or a notebook.

According to yet another aspect of the invention, the assembly 410 may be configured such that the controller 454 is adapted to move the blades 446 in response to changing inputs 458, for example to operating conditions. Such changing operating conditions may include at least one of air flow, temperature, pressure and turbulence.

According to another embodiment of the invention and referring now to FIG. 8, assembly 510 is shown. The assembly 510 includes a housing 518. The assembly also includes a squirrel cage fan 516 rotatable positioned in the housing 518. The fan 516 is rotated by motor 560 secured to housing 518. The housing 518 forms an inlet 524 and an outlet 528 such that airflow 532 advances through the assembly 510 in the direction of arrows 534. As shown in FIG. 8, member 520 in the form of a dampener vane is positioned in outlet 526 and is used to vary the airflow 532 through the assembly 510.

The dampener vane 520 may be positioned anywhere and in any orientation within the outlet 528 of the assembly 510. For convenience for example the vanes may be oriented horizontally and/or vertically. As shown in FIG. 8, a first dampener vane 519 is positioned horizontally in the outlet 528.

According to another aspect of the invention, the assembly is configured such that the first dampener vane 519 may be pivoted such that its effect on airflow 532 may be easily changed. As shown in FIG. 8, the vane 519 may be removeable from a first open or horizontal position 550 (shown as a solid line) aligned with arrow 534 showing the air flow 532 of the assembly 510 to a second closed or vertical position 452 (shown as a dashed line) extending normal to arrow 534. Back pressure and thus air flow 532 from the fan 516 may be varied by pivoting the vane 519 from the open position 550 to the closed position 552 and back.

The vane 519 may be pivoted in any suitable manner. For example, and as shown in FIG. 8A, a pivoting device 522 in the form of a motor or as shown a servo is mounted to the housing 518 of the assembly 510. The vane 519 is mounted to the servo 522 which rotates the vane 519.

While a single, pivoting vane arrangement for moveably positioning a single vane may be used, it should be appreciated and, as shown, other arrangements including multiple, pivoting, spaced apart, vanes may be used. For example, additional pivoting vanes 520, (shown as solid lines) may each be secured to housing 518 of the assembly 510 and may be oriented, for example, horizontally or vertically.

The additional pivoting vanes 520 may be pivoted in any suitable manner. For example, and as shown adjacent vanes 520 are connected at their periphery by links 545. When the servo 522 which rotates the first vane 519 is energized, the adjacent vanes 520 are pivoted by the links 545 connected to the vanes 520 rotated by the servo 522.

Alternately, each vane 520 may have its own servo 522 as shown in phantom.

Alternately and as shown in FIG. 8B, the first vane 519 may be pivoted by the use of an actuator wire 513, similar to wire 313 of the assembly 310 of FIG. 6. The stroke of the wire 513 may be multiplied by multiplier 515, similar to multiplier 315 of the assembly 310 of FIG. 6. The additional vanes 520 may either be connected by links 545 or each blade may be connected to a wire 513 and a multiplier 515.

To selectively position the vanes 520 and according to another aspect of the invention, the assembly 510 may further include a controller 554 for controlling the vanes 520. The controller may be any device capable of sending signals, either by hard wiring or wirelessly to the servo 522 or to the wire 513. The controller 554 may receive signals, either by hard wiring or wirelessly, from a signaling device 556 in the form of, for example, a master controller, an input/output device or a smart device, for example an, I-Phone, an android phone, a laptop or a notebook.

According to yet another aspect of the invention, the assembly 510 may be configured such that the controller 554 is adapted to move the vanes 520 in response to inputs 558, for example to changing operating conditions. Such changing operating conditions may include at least one of air flow, temperature, pressure and turbulence.

Figure 10:
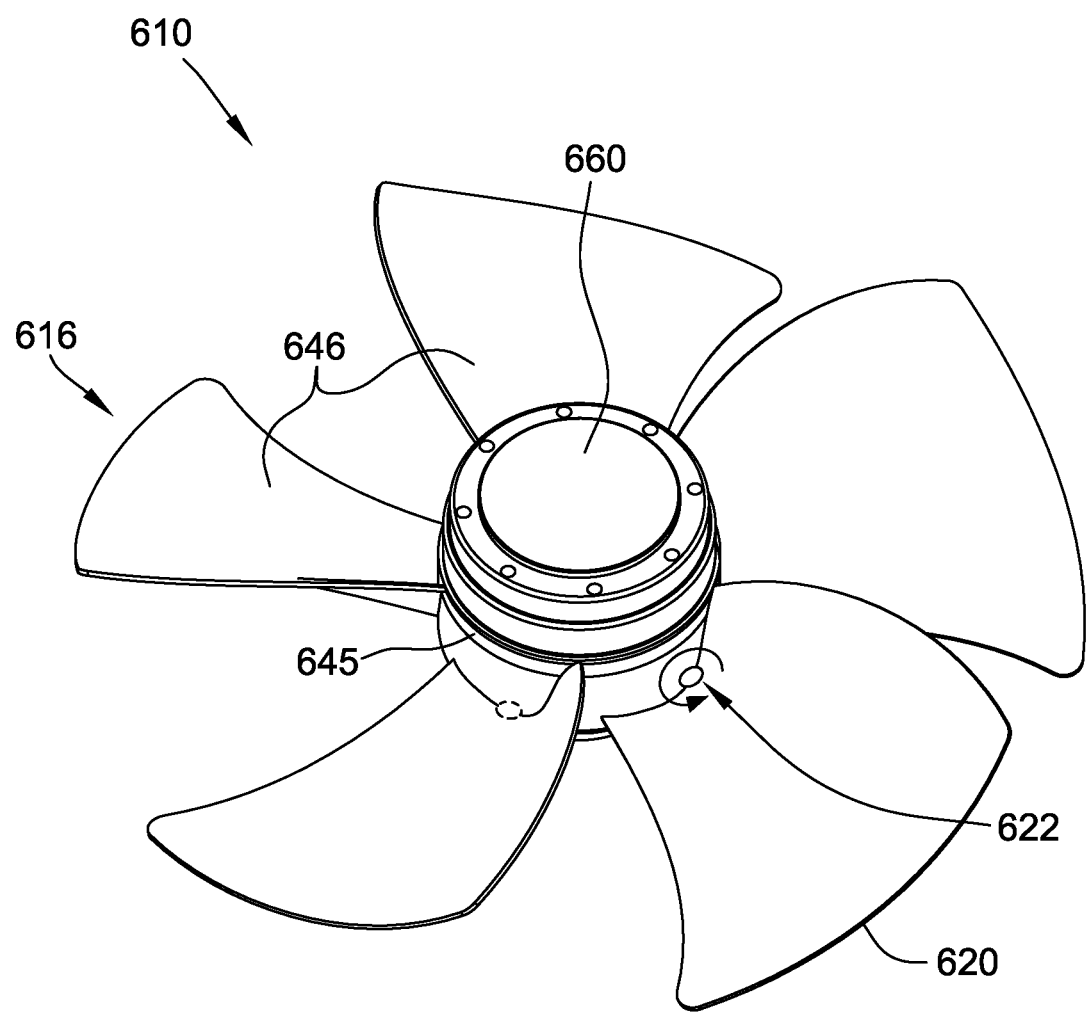
FIG. 10 is a perspective view of the fan of FIG. 9.

According to another embodiment of the invention and referring now to FIGS. 9 and 10, assembly 610 is shown. The assembly 610 includes a motor 660 to which a blade 616 is rotatably secured. The blade 616 is rotated by motor 660.

The blade 616 may be positioned anywhere and in any orientation with respect to the motor 660. For example, the blade 616 extends radially from the motor 660 and is position at an angle relative to axis of rotation 626 of the motor 660.

According to another aspect of the invention, the assembly is configured such that the blade 616 may be pivoted such that its effect on airflow 632 may be easily adjusted. As shown in FIG. 9, the blade 616 may be moveable from a first position 650 (shown as a solid lines), generally normal to rotational axis 626 of motor 660, to a second position 652 (shown as a phantom lines) extending generally parallel to rotational axis 626 of motor 660. Air flow 632 from blade 616 may be varied by pivoting the blade 616 from the first position 650 to the second position 652 and back.

The blade 616, for example first blade 620, may be pivoted in any suitable manner. For example, and as shown in FIG. 9, a pivoting device 622 in the form of a motor or, as shown, a servo is mounted to the motor 660. The blade 616 is mounted to the servo 622 which rotates the first blade 620.

While a single, pivoting blade arrangement for moveably positioning first blade 620 may be used, it should be appreciated and, as shown, other arrangements including multiple, pivoting, spaced apart, blades 616 may be used. For example, additional pivoting blades 616, (shown as solid lines) may each be secured to motor 660 and may be oriented, for example, extending from motor 660.

The additional pivoting blades 616 may be pivoted in any suitable manner. For example, and as shown adjacent blades 616 are connected at their periphery by links 645 that may, for example, have a ring shape. When the servo 522, which rotates the first blade 620, is energized, the adjacent blades 616 are pivoted by the links 645 connected to the first blade 620 rotated by the servo 622.

Alternately, each blade 620 may have its own servo 622.

Alternately and as shown in FIG. 9A, the first blade 620 may be pivoted by the use of an actuator wire 613, similar to wire 313 of the assembly 310 of FIG. 6. The stroke of the wire 613 may be multiplied by multiplier 615, similar to multiplier 315 of the assembly 310 of FIG. 6. The additional blades 616 may either be connected by links 645 or each blade may be connected to its own wire 613 and its own multiplier 615.

To selectively position the blades 620 and according to another aspect of the invention, the assembly 610 may further include a controller 654 for controlling the blades 620. The controller may be any device capable of sending signals, either by hard wiring or wirelessly to the servo 622 or to the wire 613. The controller 654 may receive signals, either by hard wiring or wirelessly, from a signaling device 656 in the form of, for example, a master controller, an input/output device or a smart device, for example an, I-Phone, an android phone, a laptop or a notebook.

According to yet another aspect of the invention, the assembly 610 may be configured such that the controller 654 is adapted to move the blades 620 in response to inputs 658, for example to changing operating conditions. Such changing operating conditions may include at least one of air flow, temperature, pressure and turbulence.

It should be appreciated that the motor 660 and the blades 616 may be positioned or mounted to any surface. For example, the motor and blades may be mounted to a ceiling to provide air flow below. Alternatively, and as shown in FIGS. 9-10 the motor and blades may be mounted in ducting 680 to provide an assembly 610 including an inlet 624 and an outlet 628.

Figure 11:
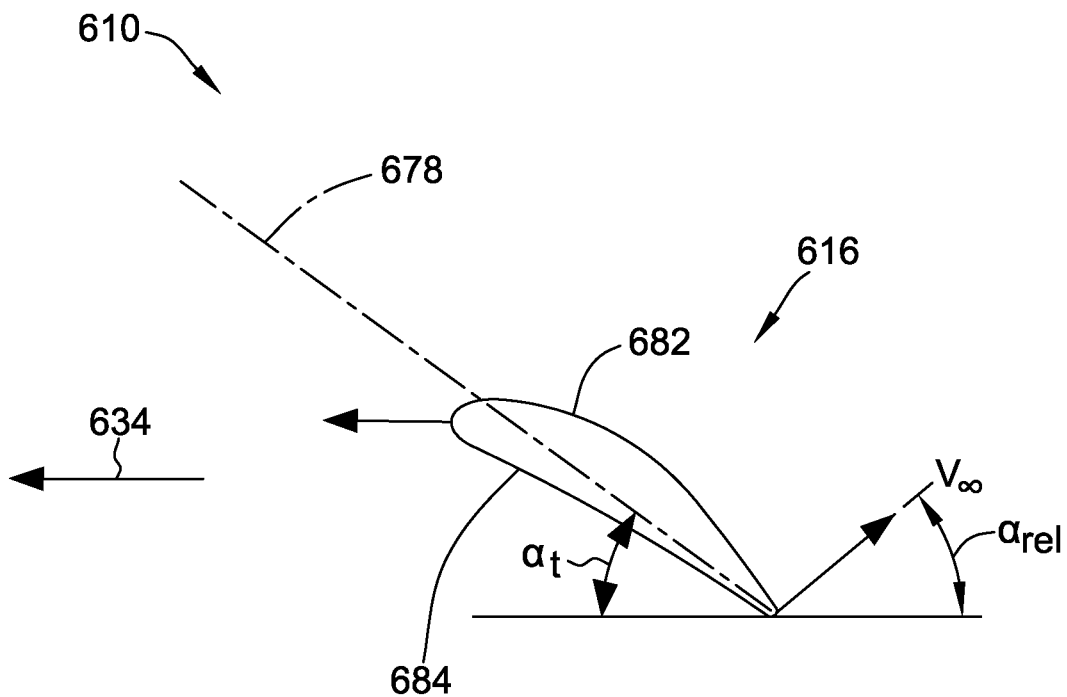
FIG. 11 is a plan view of a blade of the fan of FIG. 9.
Figure 12:
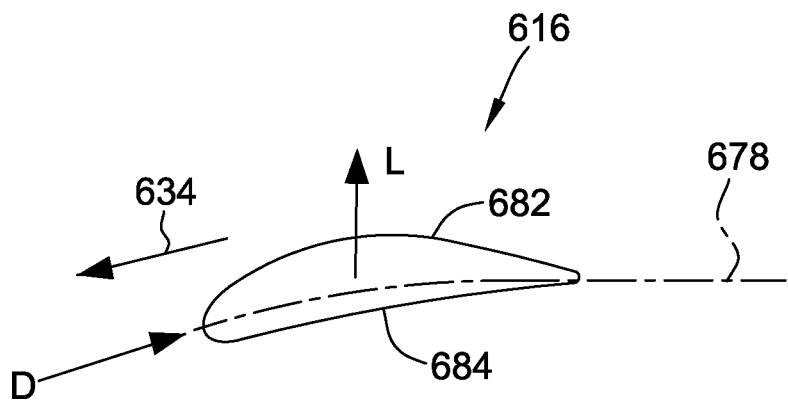
FIG. 12 is another plan view of a blade of the fan of FIG. 9.
Figure 13:
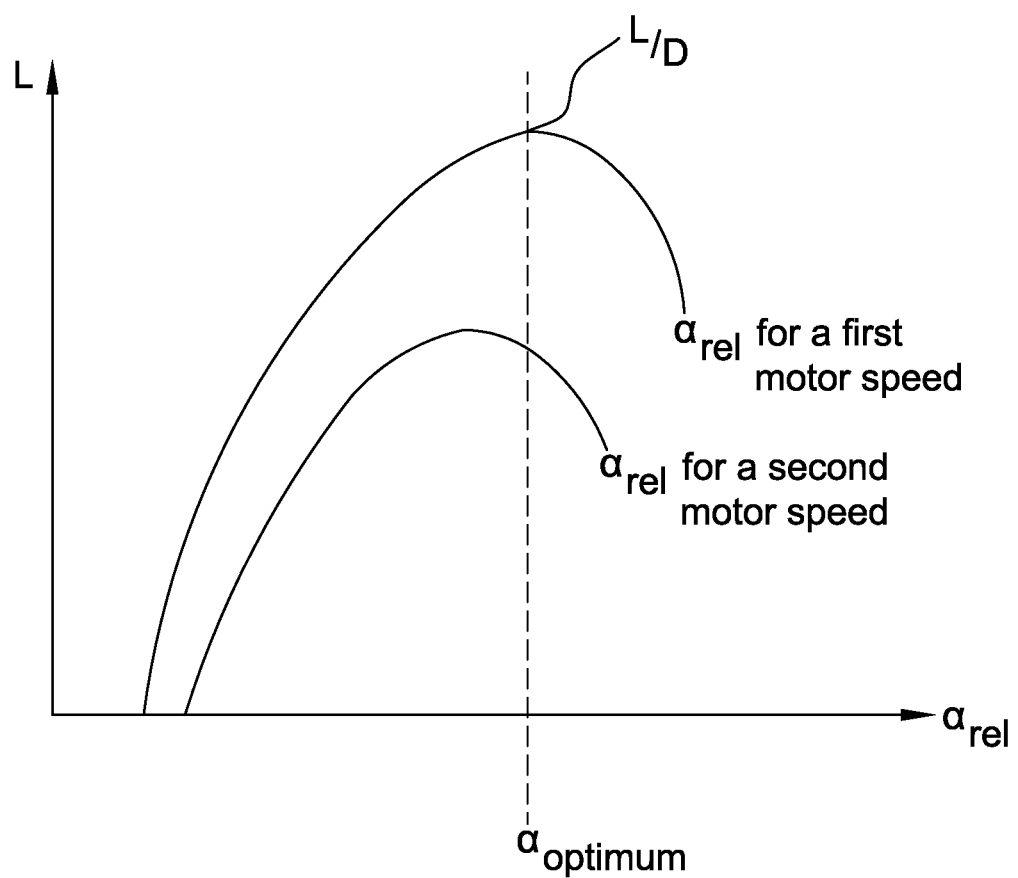
FIG. 13 is a graph of attack angle of a blade versus lift.

Referring now to FIGS. 11-13, the blades 616 may have any suitable shape and may, as shown be shaped to provide desirable aerodynamic characteristics. For example, and as shown in FIG. 11, the blade 616 may have an upper surface 682 spaced a first direction from longitudinal centerline 678 of the blade 616 and a lower surface 684 spaced a second opposed direction from longitudinal centerline 678 of the blade 616. The upper surface 682 may have a convex shape to provide lift to the blade 616. The longitudinal centerline 678 of the blade 616 forms an angle of attack $\alpha_t$ when the blade 616 is advanced in the direction of arrow 634. The lift of the blade 616 results in an effective angle of attack $\alpha_{rel}$.

Referring now to FIG. 12, the blade is exposed to two external forces when advanced in the direction of arrow 634. The first force is the drag force D in a direction generally opposed to the direction of arrow 634. The second force is the lift force L in a direction generally upward and normal to the direction of arrow 634.

Referring now to FIGS. 10-13 and more particularly to FIG. 13, drag is plotted on the abscissa and lift is plotted on the ordinate as the angle of attack $\alpha_{rel}$ is increased. The angle $\alpha_{rel}$ a varies with the speed of the motor 660. Two different curves are shown, one for each of two separate motor speeds. It should be appreciated that a certain angle of attack $\alpha_{rel}$ and at a certain speed, lift is maximized. That angle of attack is the $\alpha_{optimum}$. It is at that $\alpha_{optimum}$ that the blade 620 should be positioned. Thus, to optimize lift, the angle of attack may be varied as speed is varied by using the servo 622 or wire 613 to position the blade for optimum operation.

Figure 14:
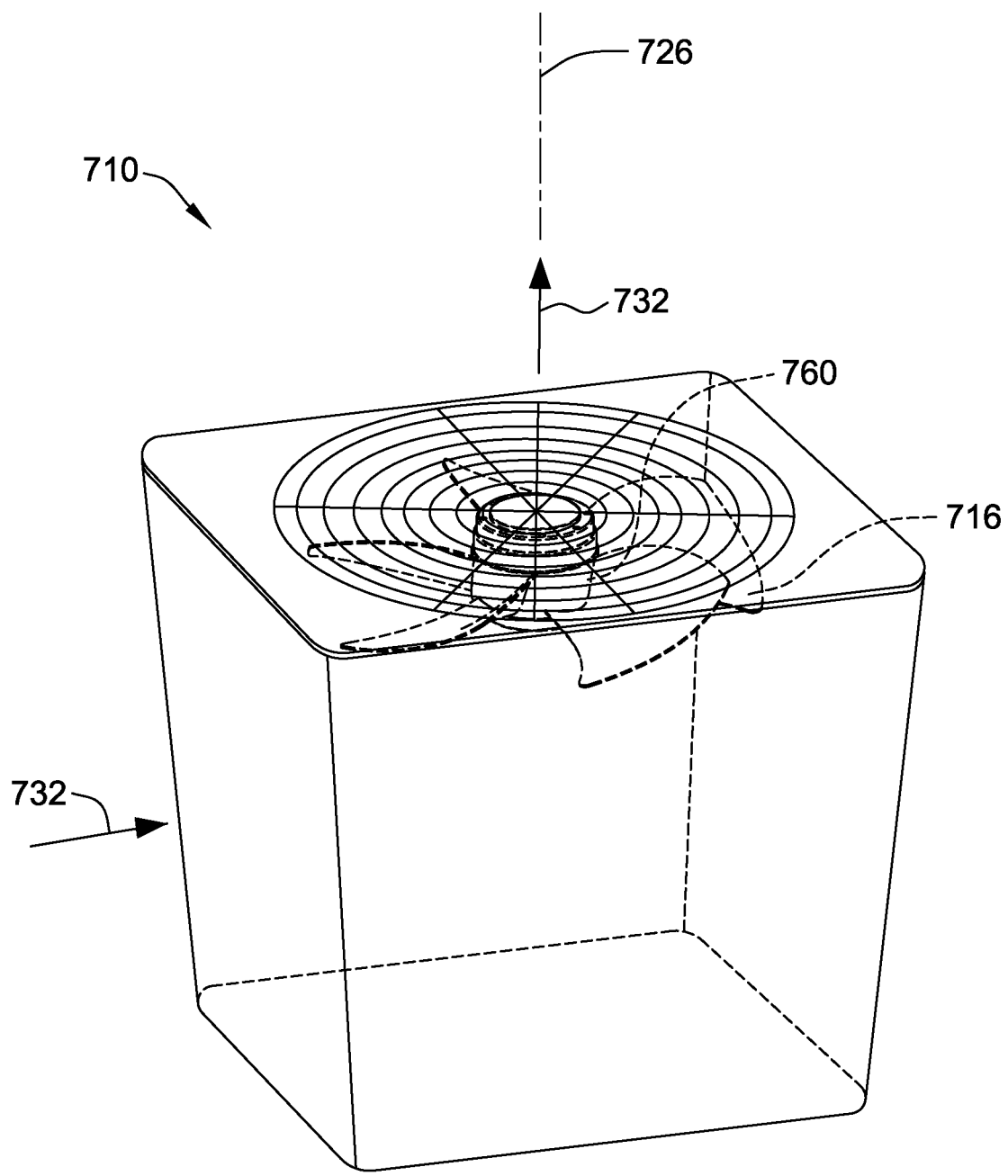
FIG. 14 is a perspective view of the fan of FIG. 9 mounted in an outdoor HVAC unit.

According to another embodiment of the invention and referring now to FIGS. 14 and 15, assembly 710 is shown. The assembly 710 includes a motor 760 to which a blade 716 is rotatably secured. The blade 716 is rotated by motor 760.

The blade 716 may be positioned anywhere and in any orientation with respect to the motor 760. For example, the blade 716 extends radially from the motor 760 and is position at an angle relative to axis of rotation 726 of the motor 760.

According to another aspect of the invention, the assembly is configured such that a first blade 720 of the blades 716 may be pivoted such that its effect on airflow 732 may be easily adjusted. As shown in FIG. 15, the blade 716 may be moveable from a first position 750 (shown as a solid line) skewed to the rotational axis 726 of motor 760 to a second position 752 (shown as a dashed line) extending normal with rotational axis 726 of motor 760 and generally perpendicular to rotational axis 726. Air flow 732 from blade 716 may be varied by pivoting the blade 716 from the first position 750 to the second position 752 and back.

The blade 716 may be pivoted in any suitable manner. For example, and as shown in FIG. 9, a pivoting device 722 in the form of a motor or as shown a servo is mounted to the motor 760. The blade 716 is mounted to the servo 722 which rotates the blade 716.

While a single, pivoting blade arrangement for moveably positioning a single blade may be used, it should be appreciated and, as shown, other arrangements including multiple, pivoting, spaced apart, blades may be used. For example, additional pivoting blades 716, (shown as solid lines) may each be secured to motor 760 and may be oriented, for example, extending from motor 760.

The additional pivoting blades 716 may be pivoted in any suitable manner. For example, and as shown adjacent blades 716 are connected at their periphery by links 745 that may, for example, have a ring shape. When the servo 722 which rotates first blade 720 is energized, the adjacent blades 716 are pivoted by the links 745 connected to the blade rotated by the servo 722.

Alternately, each blade 716 may have its own servo 722.

Alternately and referring to FIG. 15A, the first blade 720 may be pivoted by the use of an actuator wire 713, similar to wire 313 of the assembly 310 of FIG. 6. The stroke of the wire 713 may be multiplied by multiplier 715, similar to multiplier 315 of the assembly 310 of FIG. 6. The additional blades 716 may either be connected by links 745 or each blade may be connected to a wire 713 and a multiplier 715.

To further control air flow 732 from the assembly 710 and according to another aspect of the invention and referring again to FIG. 15, a member 773 in the form of a dampener vane is positioned in outlet 728 and is used to vary the airflow 732 through the assembly 710.

The dampener vane 773 may be positioned anywhere and in any orientation within the outlet 728 of the assembly 710. For convenience for example, the vanes may be oriented horizontally and/or vertically. As shown in phantom in FIG. 8, a first dampener vane 719 is positioned horizontally in the outlet 728.

According to another aspect of the invention, the assembly is configured such that the first dampener vane 719 may be pivoted such that its effect on airflow 732 may be easily adjusted. As shown in FIGS. 14-15, the first vane 719 may be moveable from a first open or vertical position 762 (shown as a solid line) aligned with arrow 734 showing the air flow 732 of the assembly 710 to a second closed or horizontal position 764 (shown as phantom lines) extending normal to arrow 734. Back pressure and thus air flow 732 from the fan 716 may be varied by pivoting the first vane 719 from the open position 762 to the closed position 764 and back.

The vane 719 may be pivoted in any suitable manner. For example, and as shown in FIG. 15, a pivoting device 766 in the form of a motor or as shown a servo is mounted to the housing 718 of the assembly 710. The first vane 719 is mounted to the servo 766 which rotates the vane 719.

While a single, pivoting vane arrangement for moveably positioning a single vane may be used, it should be appreciated and, as shown, other arrangements including multiple, pivoting, spaced apart, vanes may be used. For example, additional pivoting vanes 773, (shown as solid lines) may each be secured to housing 718 of the assembly 710 and may be oriented, for example, horizontally or vertically.

The additional pivoting vanes 773 may be pivoted in any suitable manner. For example, and as shown adjacent vanes 773 are connected at their periphery by links 768. When the servo 766 which rotates the first vane 719 is energized, the adjacent vanes 773 are pivoted by the links 768 connected to the blade rotated by the servo 766. Alternately, each vane 773 may have its own servo 766.

Alternately and referring to FIG. 15B, the first vane 719 may be pivoted by the use of an actuator wire 770, similar to wire 313 of the assembly 310 of FIG. 6. The stroke of the wire 770 may be multiplied by multiplier 772, similar to multiplier 315 of the assembly 310 of FIG. 6. The additional vanes 773 may either be connected by links 745 or each blade may be connected to a wire 770 and a multiplier 772.

Referring again to FIG. 15, to selectively position the blades 716 and to selectively position the vanes 773 and according to another aspect of the invention, the assembly 710 may further include a controller 754 for controlling the blades 716 and the vanes 773. The controller 754 may be any device capable of sending signals, either by hard wiring or wirelessly, to the servo 722 or to the wire 713 to control the blades 716 and of sending signals, either by hard wiring or wirelessly, to the servo 766 or to the wire 770 to control the vanes 773. The controller 754 may receive signals, either by hard wiring or wirelessly, from a signaling device 756 in the form of, for example, a master controller, an input/output device or a smart device, for example an, 1-Phone, an android phone, a laptop or a notebook.

Figure 16:
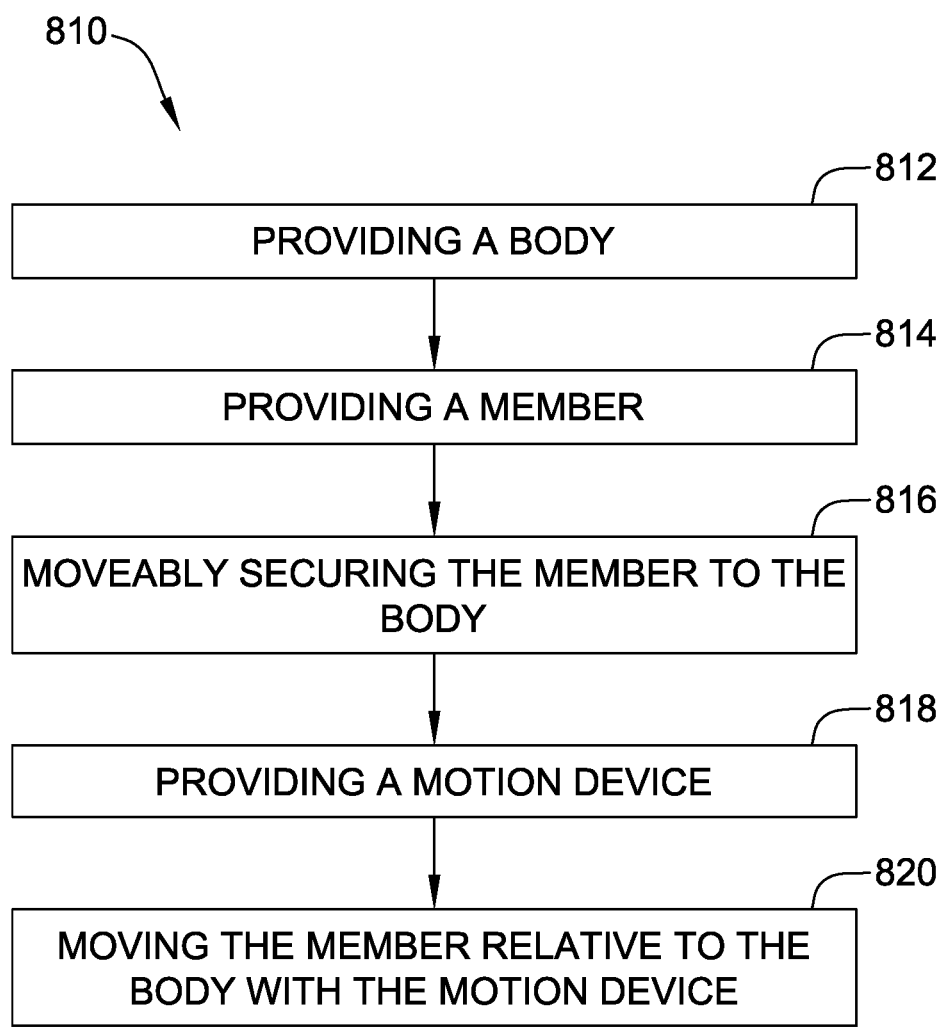
FIG. 16 is a flow chart of another aspect of the present invention in the form of a method for providing an electric machine.

According to yet another embodiment of the invention and referring to FIG. 16, a method 800 for altering the flow of air in a blower is provided. The method includes the step 812 of providing a body, the step 814 of providing a member, the step 816 of moveably securing the member to the body, the step 818 of providing a motion device and the step 820 of moving the member relative to the body with the motion device is provided.

Figure 17:
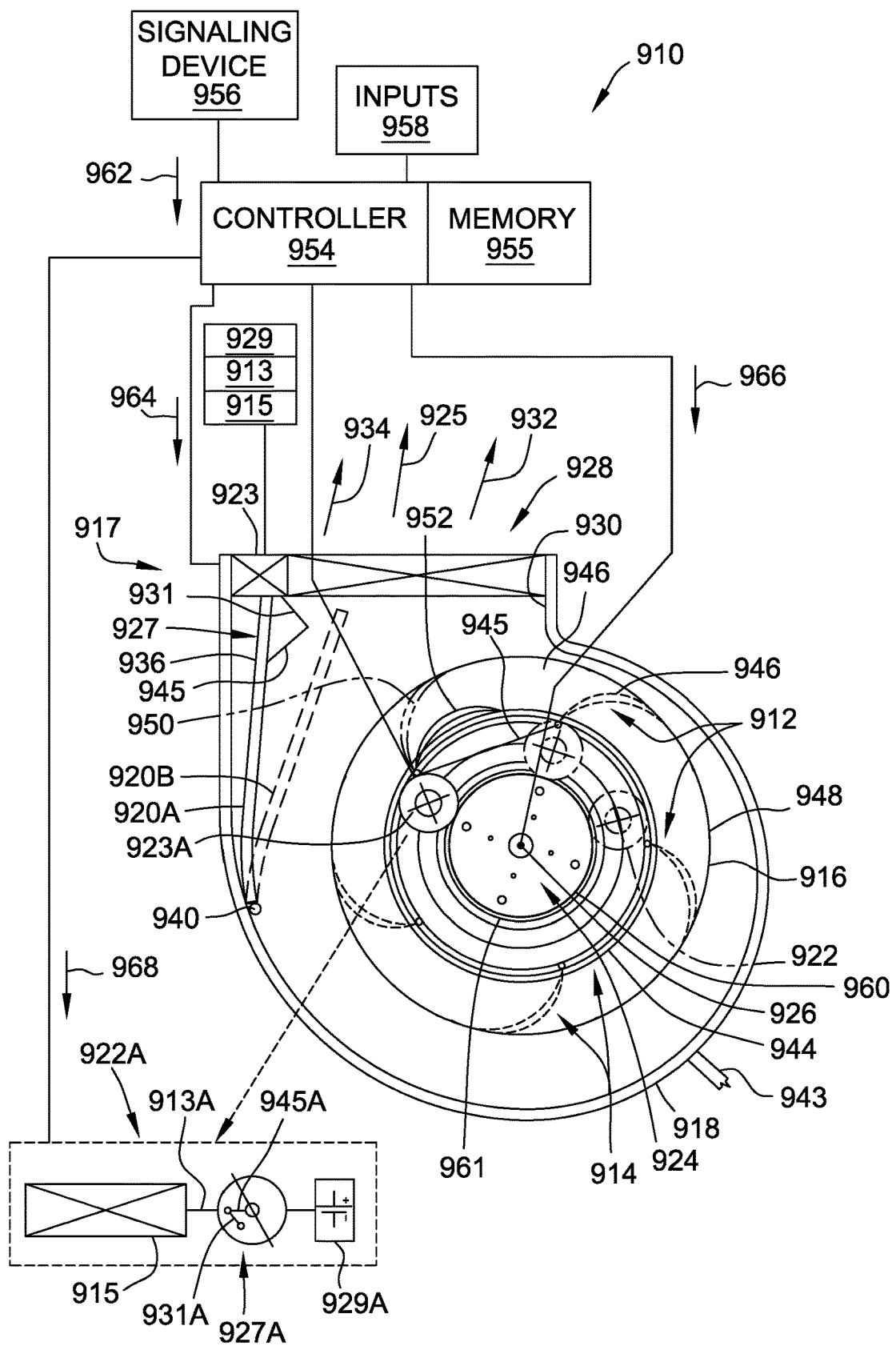
FIG. 17 is a partial enlarged view of a blower with moveable blade, a moveable wall and a moveable dampener vane, according to another aspect of the invention.

According to another aspect of the invention and referring to FIG. 17, a device 910 in the form of fluid moving device such as a fan, a blower assembly or a water pump is provided. The device 910 as shown in FIG. 17 is in the form of a blower assembly. The device 910 is utilized to advance the flow of fluid in a fluid flow device at a selected one of a plurality of fluid flow rates.

It should be appreciated that any fluid may be moved with the device of the present invention. For example, the blades of a blower assembly may be replaced with impellers in a water pump and a wall of the blower housing may be replaced with a wall of the water pump housing. Further the damper of a blower assembly may be replaced with a restriction with vanes, blade or portions restricted the water flow in a water pump. For simplicity further description of the device 900 will refer to a blower assembly, but the description may be equally applied to a water pump or an air fan.

Continuing to refer to FIG. 17, the blower assembly 910 includes a housing in the form of a blower housing 917 defining a body 916 of the blower housing 917 and a member 920 in the form of a wall of the blower housing 917 moveably secured to the body 916. The blower assembly 910 further includes a wall motion device 922 secured to the body 916 and to the member or wall 920. The motion device 922 moves the wall 920 relative to the body 916 to a selected one of a plurality of distinct wall positions, for example first position 920A and second position 920B.

Figure 18:
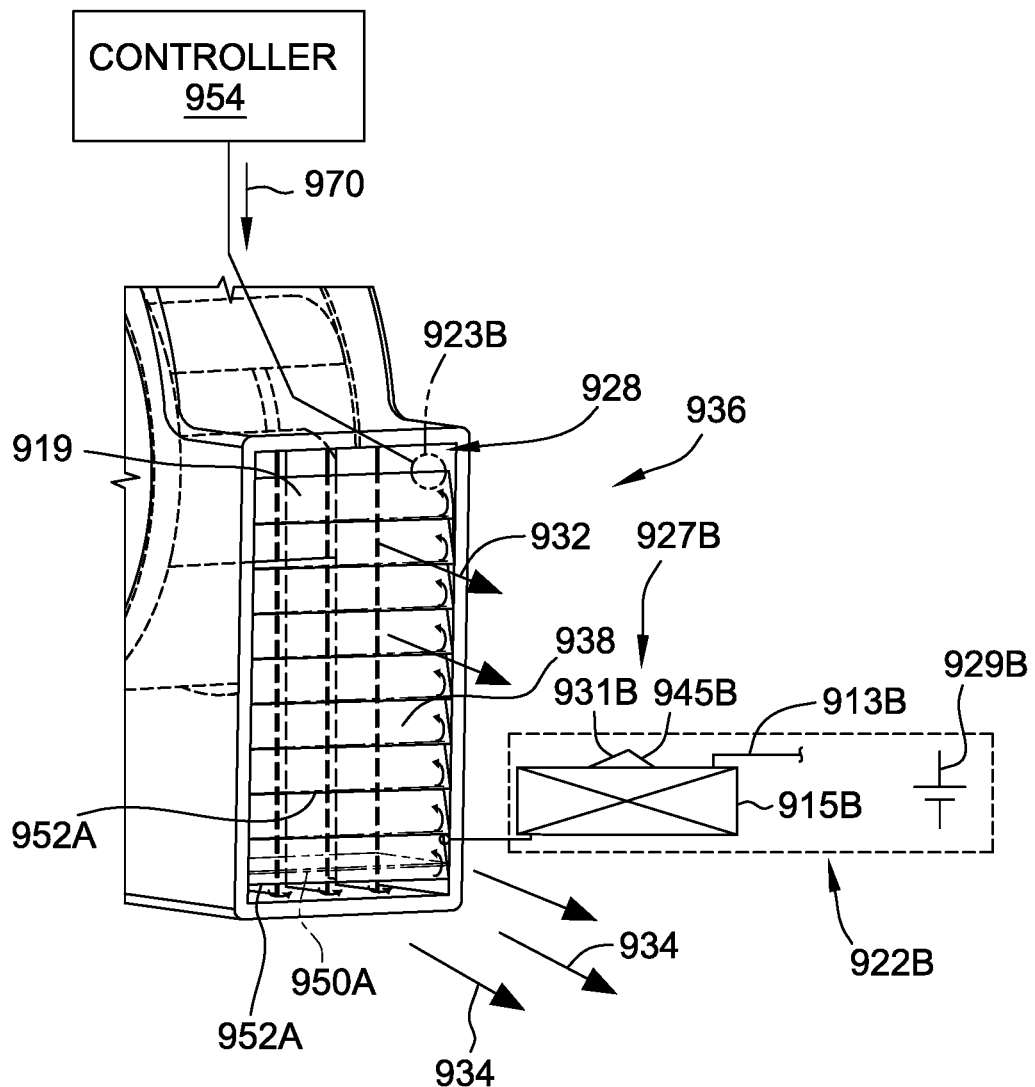
FIG. 18 is a partial enlarged perspective view of the blower of FIG. 17 showing the moveable dampener vane in greater detail.

The blower assembly also includes an air flow device or fluid moving member 914. The fluid moving member 914 may be any device that provides for the flow of a fluid. For example, the fluid moving member 914 may be a liquid pump impeller. As shown in FIGS. 17 and 18, the fluid moving member 914 may be and air flow member. For example, the air flow member 914 may be in the form of a fan or, as shown, as blower wheel 914. The blower wheel 914 is a part of blower assembly 910.

The body 916 may have any suitable size and shape and may be designed to accommodate the blower wheel 914. For a cylindrical squirrel cage or generally cylindrically shaped blower wheel 914, the body 916 typically is generally cylindrical and defines an inlet 924 positional centrally along rotational axis 926 of the blower wheel 914. The body 916 typically, further defines an outlet 928 extending outwardly from periphery 930 of the body, typically in a spirally extending fashion. The blower wheel 914 serves to advance air flow 932 in the direction of arrows 34 from inlet 924 to outlet 928. The body 916 may be made of any suitable materials and may, for example, be made of a polymer, a metal or a composite. The body 916 may be cast, molded fabricated or welded, or a combination thereof.

The member 920 may be any member capable of creating and or modifying the air flow 932. The member 920 may have any suitable size and shape. The member 920 may be made of any suitable materials and may, for example, be made of a polymer, a metal or a composite. The member 920 may be cast, molded fabricated or welded, or a combination thereof.

As shown in the embodiment of FIGS. 17 and 18, the body 916 includes a blower housing 917. The member 920 forms a wall of the blower housing 917. The wall 920 may be integral with the housing 917 or may be a separate component. The wall 920 may be connected to the housing 917 by, for example, a hinge 940 which may be a living hinge.

Similar to the body 916, the blower housing 917 may be made of any suitable materials and may, for example, be made of a polymer, a metal or a composite. The blower housing 917 may be cast, molded fabricated or welded, or a combination thereof. The blower housing 917 may be secured to blower assembly 910 at, for example, assembly frame 943.

The blower wheel 914 may include a generally cylindrical body or blower frame 944 to which one or more blades or fins 912 are secured, typically equally spaced about periphery 948 of the frame 944.

As shown in FIG. 17, the member 920, may, for example, include or be in the form of a wall that extends from hinge 940 and may be a separate component or integral with blower housing 917. The wall 920 may be made from any suitable, durable material. For example, the wall 920 may be made from a polymer, a composite or a metal. The wall 920 may have any suitable shape and may as shown be generally rectangular and generally sheet-like and arcuate.

The wall 920, as shown in FIG. 17, may be moveable from first or open position 920A shown as a solid line to second or closed position 920B shown as a phantom line. As shown in FIG. 17, the wall 920, when in closed position 920B, is closely conforming to blades 912 of the squirrel cage fan or blower wheel 914.

As shown in FIG. 17, the wall 920, when in open position 920A, is spaced from blades 912 of the squirrel cage fan 914. Air flow 932 from the blower wheel 914 adjacent the outlet 928 may be varied by moving the wall from the open position 920A to the closed position 920B and back.

While, as shown, a pivoting, hinged arrangement for moveably positioned the wall 920 onto the housing 917 may be used, it should be appreciated that other arrangements may be used to provide a moveable wall. For example, the wall may extend outwardly as a drawer face along drawer guide rails, not shown, or the wall may be flexible and/or expandable and be moved outwardly by, for example, air pressure.

As shown in FIG. 17, the wall 920 may be moved by wall motion device 922. The wall motion device 922 may be any device capable of moving the wall 920. The wall motion device 922 may manually move the wall 920 or do so under power and/or remotely. It should be appreciated that the motion device may be merely capable of positioning the wall 920 in either the open position 920 A or the closed position 920 B. Such a motion device may be in the form of a solenoid. Preferably the motion device 922 may be used to selectively position the wall 920 in any desired position from the open position 920 A to the closed position 920 B.

The motion device 922 may, as shown, include an electric motor or a servo 923 which may be configured to so selectively position the wall 920. The servo motor 923 may include an arm 931 which is connected to a linkage 927. The linkage 927 is connected to the wall 920 to move the wall 920. The motor 923 may be powered by AC or DC power and connected to a utility power source (not shown). As shown the motion device 922 is connected to a battery 929 that serves to power the motion device 922. The servo motor may be a radio-controlled hobby type servo motor.

The motion device 922 may be similar to motion device 322 of FIG. 6 and may include a shaped memory alloy actuator wire similar to wire 313. The wire 313, when exposed to an electrical current, contracts. This contraction is in the order of magnitude of 3 to 4 percent of its length and thus provides for a stroke or movement of the wire of around 3 to 4 percent of the wire's length. The wire thus typically may need a device attached to the wire 313 to multiply the stroke it can provide so that it may effectively move the wall 338 sufficiently. For example, and as shown the motion device 322 may further include a multiplier 315.

The multiplier 315 may be any mechanical device capable of multiplying the movement provided by the wire 313. For example, the multiplier may be a normal bias spring, a dead weight bias, a leaf spring bias, a right angle pull, a simple lever, an adjusting curvature, and a clam shell. The multiplier 315 may be attached to the wire to increase the motion provided by the wire 313.

The wire 313 may be electrically connected to power source 317 either directly through a switch 319 or, as shown, through controller 354, similar to controller 54 of apparatus 10 as shown in FIG. 1.

The wire 313 is a shaped memory alloy actuator wire. The shaped memory alloy actuator wire may be available as a Flexinol® actuator wire. Such Flexinol® actuator wires are available from Dynalloy, Inc. 1562 Reynolds Avenue, Irvine, Calif. 92614.

The multiplier 315 may be any mechanical device and such devices are described in greater detail in a publication titled "Technical Characteristics of Flexinol® Actuator Wires", F1140 Rev 1.2, available from Dynalloy, Inc. 1562 Reynolds Avenue, Irvine, Calif. 92614 and available online at http://www.dynalloy.com hereby incorporated in its entirety by reference The blower assembly also includes a motor, for example an electric motor 960 for rotating the blower wheel 914. The electric motor 960 may be a motor capable of rotating at a selected one of a plurality of rotational speeds. For example, the motor 960 may, for example, be an induction motor, a permanent magnet motor, a switched reluctance motor or an Electronically Commutated Motor (ECM). The motor 960 may include a housing 961 and a bracket (not shown) for mounting the motor 960 to the blower housing 917.

The blower assembly also includes a controller 954 connected to the motor 960 and to the motion device 922. The controller 954 may be any device capable of sending signals, either by hard wiring or wirelessly to the motion device 922 and to the motor 960. The controller 954 may receive air flow rate command signals 962, either by hard wiring or wirelessly, from a signaling device 956 in the form of, for example, a user interface, a master controller, an input/output device or a smart device, for example an, I-Phone, an android phone, a laptop or a notebook.

The controller 954 may include memory 955 for storing and or processing information for transforming the air flow rate command signal 962 to device inputs 958 to set the motor speed, to set the blade angle, to set the vane angle and to set the wall position to provide the lowest energy cost for that particular requested air flow rate. The stored and or processed information may be in the form of, for example, tables, formulas and computer programs.

The controller 954 is capable of receiving command signals 962 in the form of, for example, an air flow rate command signal 962 from the signaling device 956 to command the controller 954 to command the blower assembly 917 to operate at the selected one of a plurality of air flow rates.

Each combination of the selected one of the plurality of selectable rotational speeds and the selected one of the plurality of distinct wall positions define an energy usage rate for the motor. Each combination of the one of the plurality of distinct wall positions and the one of the plurality of selectable rotational speeds defines an air flow output of the blower.

It should be appreciated that energy usage rates that result from each of the combinations of each of the plurality of selectable rotational speeds and of each of the plurality of distinct wall positions can either be organized into an energy usage, rotational speeds and wall positions table tabulated in the memory 955 of the controller 954, calculated based on a formula or formulas derived from the energy usage, rotational speeds and wall positions table or otherwise derived from the energy usage, rotational speeds and wall positions table.

The controller 954 may calculate a combination of one optimum wall position and one optimum rotational speed to provide for minimal energy usage rate at that selected one of a plurality of air flow rates. The controller sends a wall position signal 964 to the motion device to move the wall 920 to the optimum wall position and sends a rotational speed signal 966 to the motor 960 to rotate the blower wheel 914 at the optimum rotational speed.

According to yet another aspect of the invention, the assembly 910 may be configured such that the controller 954 is adapted to move the wall 920 in response to changing device inputs 958, for example to operating conditions. Such changing operating conditions may include at least one of air flow, temperature, pressure and turbulence.

According to yet another aspect of the invention, the assembly 910 may be configured such that the controller 954 is adapted to change the rotational speed of motor 960 in response to changing device inputs 958, for example to operating conditions. Such changing operating conditions may include at least one of air flow, temperature, pressure and turbulence.

According to another aspect of the invention and continuing to refer to FIG. 17 and FIG. 18, blades 912 (shown as dashed lines) are moveably positioned on periphery 948 of the body 944 of wheel 914.

The fins or blades 912 of blower wheel 914 may be moveable from a closed or tangential position 952 (shown as a solid line) aligned with periphery 948 of the body 944 to an open or radial position 950 (shown as a dashed line) extending radially outwardly from axis 926 of wheel 914. Air flow 932 from the wheel or fan 914 may be varied by pivoting the blade 912 from radial or open position 950 to the closed or tangential position 952 and back.

The blade 912 may be pivoted in any suitable manner. For example, and as shown in FIG. 17, an angular orientation device 922 A in the form of a motor or, as shown, includes a servo 923 A mounted to the periphery 948 of the blower wheel 914. The blade 912 is mounted to the servo 923 A which rotates the blades 912. A battery 929 A may be used to provide power to the servo 923 A.

While a single, pivoting blade arrangement for moveably positioning a single blade may be used, it should be appreciated and, as shown, other arrangements including multiple, pivoting, spaced apart, blades may be used. For example, additional pivoting blades 912, (shown as dashed lines) may each be positioned on periphery 948 of the body 944.

The additional pivoting blades 912 may be pivoted in any suitable manner. For example, and as shown adjacent blades 912 are connected at their periphery by a linkage 927 A including links 945 A and arms 931 A. When the angular orientation device 922 A which rotates the blade 912 is energized, the adjacent blades 912 are pivoted by the links connected to the blade rotated by angular orientation device 922 A.

Alternately, each blade 912 may have its own angular orientation device 922 A.

Alternately, the first blade 912 may be pivoted by the use of an actuator wire 913A, similar to wire 313 of the assembly 310 of FIG. 6. The stroke of the wire 913A may be multiplied by multiplier 915A, similar to multiplier 315 of the assembly 310 of FIG. 6. The additional blades 912 may either be connected by links 945A or each blade may be connected to a wire 913 and a multiplier 915.

The device input 948 to the motor 960 may be in the form of a blade angle command signal 968 to provide for the desired optimum energy usage blade angle.

The controller 954 may receive signals, either by hard wiring or wirelessly, from signaling device 956 in the form of, for example, a master controller, an input/output device or a smart device, for example an, I-Phone, an android phone, a laptop or a notebook.

According to yet another aspect of the invention, the assembly 910 may be configured such that the controller 954 is adapted to move the blades 912 in response to changing inputs 958, for example to operating conditions. Such changing operating conditions may include at least one of air flow, temperature, pressure and turbulence.

According to another aspect of the invention, the blower assembly 910 may be configured such that the controller 954 is connected to the angular orientation device 922 A. The controller 954 calculates a combination of one optimum wall position, one optimum blade angular position and one optimum rotational speed to provide for minimal energy usage rate at that selected one of a plurality of air flow rates.

The controller 954 sends a blade angle command signal 968 to the angular orientation device 922A to move the first blade 912 and the second blade 912 to the optimum blade angular position relative to the wheel body 944. The controller 954 sends a wall position signal 964 to the motion device 922 to move the wall 920 to the optimum wall position and sends a rotational speed signal 966 to the motor 960 to rotate the blower wheel 914 at the optimum rotational speed.

According to another aspect of the invention, the blower assembly 910 further includes a dampener or dampener assembly 936 including vanes 938 that are moveably oriented with respect to the blower housing 917 and a vane orientation device 922B for orienting the dampener vanes 938 with respect to the blower housing 917 to one of a plurality of dampener vane positions relative to the blower housing 917.

According to another embodiment of the invention and referring now to FIG. 18, blower assembly 910 further includes movable member 938 in the form of a dampener vane 938 positioned in outlet 928 of the blower housing 917. The dampener vane 938 is used to further vary the airflow 932 through the blower assembly 910.

The dampener 936 may be positioned anywhere and in any orientation within the outlet 928 of the assembly 910. For convenience, for example, the vanes 938 may be oriented horizontally and/or vertically. As shown in FIG. 8, a first dampener vane 919 is positioned horizontally in the outlet 928. The dampener 936, as shown in FIG. 18 has a plurality of equally spaced apart vanes 938.

According to another aspect of the invention, the assembly 910 is configured such that the dampener vanes 938 may be pivoted such that its effect on airflow 932 may be easily adjusted.

As shown in FIG. 18, the vanes 921 may be moveable from a first open or horizontal position 950A (shown as a solid line) aligned with arrow 934 showing the air flow 932 of the blower assembly 910 to a second closed or vertical position 952A (shown as a dashed line) extending normal to arrow 934. Back pressure and thus air flow 932 from the blower wheel 914 may be varied by pivoting the vanes 938 from the open position 950 to the closed position 952 and back.

The vanes 938 may be pivoted in any suitable manner. For example, and as shown in FIG. 18, a pivoting device 922B in the form of a motor or as shown includes a servo 923B is mounted to the blower housing 917 of the blower assembly 910. The vanes 938 are mounted to the servo 922B which rotates the vanes 938.

While a single, pivoting vane arrangement for moveably positioning a single vane 919 may be used, it should be appreciated and, as shown, other arrangements including multiple, pivoting, spaced apart, vanes may be used. For example, additional pivoting vanes 938, (shown as solid lines) may each be secured to blower housing 917 of the blower assembly 910 and may be oriented, for example, horizontally or vertically.

The additional pivoting vanes 938 may be pivoted in any suitable manner. For example, and as shown adjacent vanes 938 are connected at their periphery by links 945B. When the servo 923B which rotates the first vane 919 is energized, the adjacent vanes 938 are pivoted by the links 945B connected to the vane 919 rotated by the servo 923B.

Alternately, each vane 921 may have its own servo.

Alternately and as shown in FIG. 18, the first vane 919 may be pivoted by the use of an actuator wire 913B, similar to wire 313 of the assembly 310 of FIG. 6. The stroke of the wire 913B may be multiplied by multiplier 915B, similar to multiplier 315 of the assembly 310 of FIG. 6. The additional vanes 938 may either be connected by links 945B or each vane may be connected to wire 913B and a multiplier 915B.

The vane orientation device 922 B may, as shown, include electric motor or a servo 923 B which may be configured to so selectively angularly orient the vanes 938. The servo motor 923 B may include an arm 931 B which is connected to a linkage 927 B. The linkage 927 B is connected to the vanes 938 to move the vanes 938. The motor 923 B may be powered by AC or DC power and connected to a utility power source (not shown). As shown the vane orientation device 922 B is connected to a battery 929 B that serves to power the vane orientation device 922 B. The servo motor 923 B may be a radio-controlled hobby type servo motor.

The controller 954 may receive signals, either by hard wiring or wirelessly, from signaling device 956 in the form of, for example, a master controller, an input/output device or a smart device, for example an, I-Phone, an android phone, a laptop or a notebook.

The device input 948 to the motor 960 may be in the form of a vane angle command signal 970 to provide for the desired optimum energy usage vane angle.

According to yet another aspect of the invention, the assembly 910 may be configured such that the controller 954 is adapted to move the vanes 921 in response to inputs 958, for example to changing operating conditions. Such changing operating conditions may include at least one of air flow, temperature, pressure and turbulence.

According to another aspect of the invention, the blower assembly 910 may be configured such that the controller 954 is connected to the vane orientation device 922B, to the wall motion device 922 and to the motor 960. The controller 954 calculates a combination of one optimum wall position, one optimum dampener vane position and one optimum rotational speed to provide for minimal energy usage rate at that selected one of a plurality of air flow rates. The controller 954 sends a vane angle command signal 970 to the vane orientation device 922B to move the dampener vanes 938 to the optimum dampener vane position. The controller 954 also sends a wall position signal 964 to the wall motion device 922 to move the wall 920 to the optimum wall position. The controller 954 also sends a rotational speed signal 966 to the motor 960 to rotate the blower wheel 914 at the optimum rotational speed.

According to another aspect of the invention, the blower assembly 910 may be configured such that the controller 954 is connected to the vane orientation device 922B, to the wall motion device 922, to the angular orientation device 922A and to the motor 960. The controller 954 calculates a combination of one optimum wall position, one optimum dampener vane position, one optimum blade angular position and one optimum rotational speed to provide for minimal energy usage rate at that selected one of a plurality of air flow rates. The controller 954 sends a dampener vane position signal 970 to the vane orientation device 922B to move the dampener vanes 938 to the optimum dampener vane position. The controller 954 sends a blade angle command signal 968 to the angular orientation device 922A to move the blades 912 to the optimum blade angular position. The controller 954 also sends a wall position signal 964 to the wall motion device 922 to move the wall to the optimum wall position. The controller 954 also sends a rotational speed signal 966 to the motor 960 to rotate the blower wheel 914 at the optimum rotational speed.

According to another aspect of the invention, the blower assembly 910 may be configured such that the controller 954 is connected to the wall motion device 922 to the angular orientation device 922A and to the motor 960. The controller 954 calculates a combination of one optimum wall position, one optimum dampener vane position, one optimum blade angular position and one optimum rotational speed to provide for minimal energy usage rate at that selected one of a plurality of air flow rates. The controller 954 sends a dampener vane position signal to the vane orientation device 922B to move the dampener vanes 921 to the optimum dampener vane position. The controller 954 sends a blade orientation signal to the angular orientation device 922A to move the blades 912 to the optimum blade angular position.

The controller 954 also sends a wall position signal to the wall motion device 922 to move the wall to the optimum wall position. The controller 954 also sends a rotational speed signal to the motor 960 to rotate the blower at the optimum rotational speed.

Figure 19A:
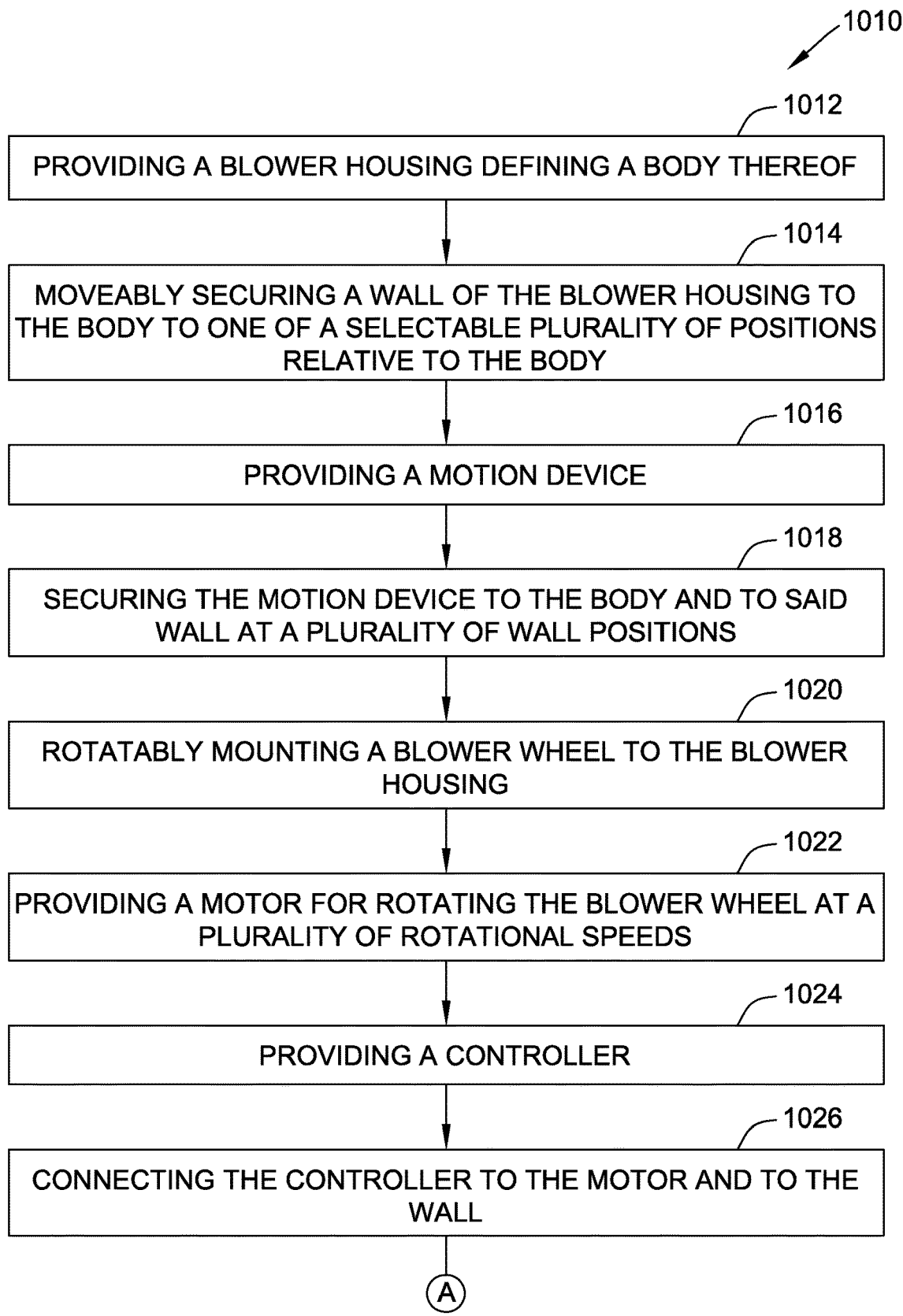
FIG. 19A is a first portion of a flow chart of another aspect of the present invention in the form of a method for providing a blower.
Figure 19B:
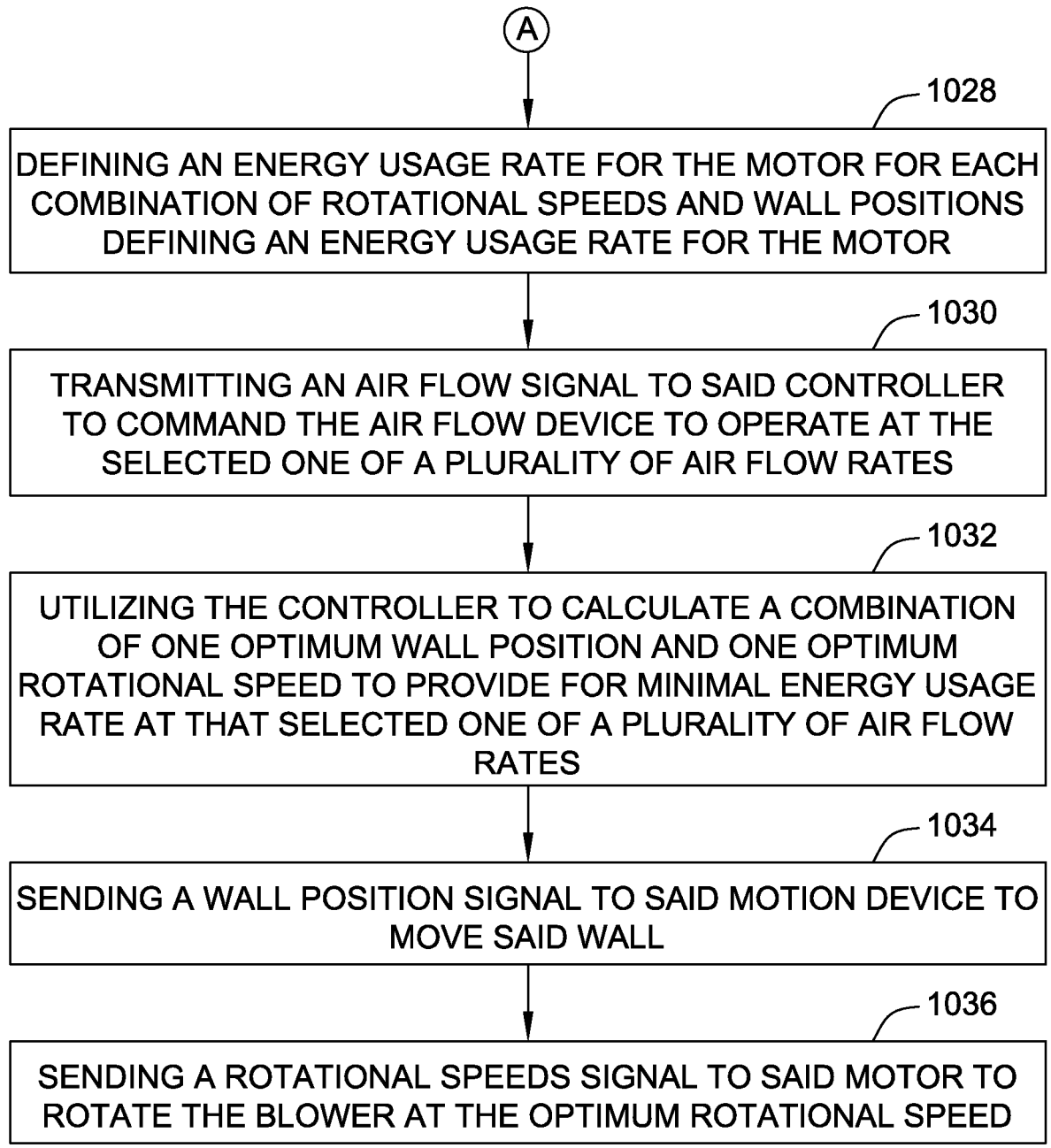
FIG. 19B is a second portion of the flow chart of FIG. 19A.

According to another aspect of the invention and referring to FIG. 19A and FIG. 19B, a method 1010 for advancing the flow of fluid in a fluid flow device at a selected one of a plurality of fluid flow rates is provided. The method includes step 1012 of providing a housing defining a body thereof and step 1014 of moveably securing a wall of the housing to the body to one of a selectable plurality of positions relative to the body. The method includes step 1016 of providing a motion device and step 1018 of securing the motion device to the body and to the wall at a plurality of wall positions and step 1020 of rotatably mounting a fluid moving member to the housing.

The method also includes step 1022 of providing a motor for rotating the fluid moving member at a plurality of rotational speeds and step 1024 of providing a controller and step 1026 of connecting the controller to the motor and to the wall.

The method also includes step 1026 of defining an energy usage rate for the motor for each combination of rotational speeds and wall positions and step 1028 of defining an energy usage rate for the motor and step 1030 of transmitting a fluid flow signal to the controller to command the fluid flow device to operate at the selected one of a plurality of fluid flow rates.

The method also includes step 1032 of utilizing the controller to calculate a combination of one optimum wall position and one optimum rotational speed to provide for minimal energy usage rate at that selected one of a plurality of fluid flow rates.

The method also includes step 1034 of sending a wall position signal to the motion device to move the wall and step 1036 of sending a rotational speeds signal to the motor to rotate the fluid moving member at the optimum rotational speed.

According to another aspect of the invention, the method further includes the steps of providing a controller for controlling the motion device, measuring at least one of temperature, air flow, turbulence and pressure, and moving the member relative to the body with the motion device in response to changes in at least one of temperature, air flow, turbulence and pressure.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blower assembly for advancing flow of air in a blower at a selected one of a plurality of air flow rates, said assembly comprising:
    a blower housing defining a body thereof;
    a wall of said blower housing moveably secured to said body;
    a motion device secured to said body and to said wall, said motion device moving said wall relative to said body to a selected one of a plurality of distinct wall positions, wherein said motion device comprises a servo motor;
    a blower wheel rotatably mounted to said blower housing;
    a motor for rotating the blower wheel at a selected one of a plurality of rotational speeds, each combination of the selected one of a plurality of selectable rotational speeds and the selected one of a plurality of distinct wall positions defining an energy usage rate for the motor for rotating the blower wheel and an air flow output of the blower; and a controller connected to said motor for rotating the blower wheel and to said motion device, said controller configured to receive an air flow signal to command the blower assembly to operate at the selected one of a plurality of air flow rates, said controller selecting, based on the energy usage rates, rotational speeds, and wall positions table stored in a memory of said controller, a combination of a first optimum wall position and a first optimum rotational speed to provide a first minimum energy usage rate at the selected one of a plurality of air flow rates, said controller sending a wall position signal to said motion device to move said wall to the first optimum wall position and for sending a rotational speed signal to said motor for rotating the blower wheel to rotate the blower wheel at the first optimum rotational speed.

2. The assembly in accordance with claim 1, wherein the motor for rotating the blower wheel is an ECM motor.

3. The assembly in accordance with claim 1, wherein said wall of said blower housing moveably secured to said body is pivotally connected to said body.

4. The assembly in accordance with claim 1, wherein said blower wheel includes a wheel body and a first blade connected to said wheel body.

5. The assembly in accordance with claim 4, wherein said wheel body includes a second blade connected to said wheel body.

6. The assembly in accordance with claim 5, wherein said first blade and said second blade are rotatably positionable with respect to said wheel body.

7. The assembly in accordance with claim 6:

further comprising servo motors for rotating said first blade and said second blade connected to said first blade, to said second blade and to said wheel body, said servo motors for rotating said first blade and said second blade configured to angularly orient said first blade and said second blade relative to said wheel body to one of a plurality of blade angular positions relative to said wheel body; and wherein said controller is connected to said servo motors for rotating said first blade and said second blade, said controller sending a blade angular position signal to said servo motors for rotating said first blade and said second blade to move said first blade and said second blade relative to said wheel body to position said first blade and said second blade at a blade angular position of the plurality of blade angular positions, sending a second wall position signal to said motion device to move said wall to a second optimum wall position and sending a second rotational speed signal to said motor for rotating the blower wheel to rotate the blower wheel at a second optimum rotational speed.

8. The assembly in accordance with claim 1:

further comprising a dampener vane moveably orientable with respect to the blower housing;

further comprising a servo motor for orienting the dampener vane configured to orient the dampener vane with respect to said blower housing to one of a plurality of dampener vane positions relative to said blower housing; and wherein said controller is connected to said servo motor for orienting the dampener vane, said controller sending a dampener vane position signal to said servo motor for orienting the dampener vane to move said dampener vane to a dampener vane position of the plurality of dampener vane positions, sending a second wall position signal to said motion device to move said wall to a second wall position and sending a second rotational speed signal to said motor for rotating the blower wheel to rotate the blower wheel at a second optimum rotational speed.

9. A device for advancing flow of a fluid at a selected one of a plurality of fluid flow rates, said device comprising:

a housing defining a body thereof;

a wall of said housing moveably secured to said body;

a motion device secured to said body and to said wall, said motion device moving said wall relative to said body to a selected one of a plurality of distinct wall positions, wherein said motion device comprises a servo motor;

a fluid moving member rotatably mounted to said housing, said fluid moving member comprising a blower wheel;

a motor for rotating the fluid moving member at a selected one of a plurality of rotational speeds, each combination of the selected one of a plurality of rotational speeds and the selected one of a plurality of distinct wall positions defining an energy usage rate for the motor for rotating the fluid moving member, each combination of said selected one of a plurality of distinct wall positions and said selected one of a plurality of rotational speeds defining a fluid flow out of the device for advancing flow;

a plurality of blades including a first blade and a second blade, the plurality of blades rotatably positionable with respect to said fluid moving member;

servo motors for rotating said first blade and said second blade connected to said first blade and said second blade, said servo motors for rotating said first blade and said second blade to angularly orient said first blade and said second blade relative to said fluid moving member to one of a plurality of blade angular positions relative to said fluid moving member; and a controller connected to said motor for rotating the fluid moving member, said motion device and said servo motors for rotating said first blade and said second blade, said controller configured to receive a fluid flow signal to command the device for advancing flow to operate at the selected one of a plurality of fluid flow rates, said controller sending a wall position signal to said motion device to move said wall to a first optimum wall position, sending a rotational speed signal to said motor for rotating the fluid moving member to rotate the fluid moving member at a first optimum rotational speed and sending an angular orientation signal to said servo motors for rotating said first blade and said second blade to orient said first blade and said second blade at a first blade angular position of the plurality of blade angular positions.

10. The device in accordance with claim 9, wherein the fluid comprises air.

11. The device in accordance with claim 9, wherein the fluid comprises water.

12. The device in accordance with claim 9:

further comprising a dampener vane moveably oriented with respect to the housing;

further comprising a servo motor for orienting the dampener vane configured to orient the dampener vane with respect to said housing to one of a plurality of dampener vane positions relative to said housing; and wherein said controller is connected to said servo motor for orienting the dampener vane, said controller sending a dampener vane position signal to said servo motor for orienting the dampener vane to move said dampener vane to a dampener vane position of the plurality of dampener vane positions, sending the wall position signal to said motion device to move said wall to a second optimum wall position, sending an angular orientation signal to said servo motors for rotating said first blade and said second blade to rotate the plurality of blades to a second blade angular position of the plurality of blade angular positions and sending a second rotational speed signal to said motor for rotating the fluid moving member to rotate the fluid moving member at a second rotational speed.

13. The device in accordance with claim 12, wherein said controller is adapted to send signals to move at least one of said wall relative to said body, said plurality of blades relative to said fluid moving member and said dampener vane relative to said housing in response to changing operating conditions including at least one of fluid flow, temperature, pressure and turbulence.

14. The device in accordance with claim 9, wherein said motor for rotating the fluid moving member comprises an ECM motor.

15. The device in accordance with claim 9, wherein said controller is adapted to send signals to move at least one of said wall relative to said body and said plurality of blades relative to said fluid moving member in response to changing operating conditions including at least one of fluid flow, temperature, pressure and turbulence to provide the first minimal energy usage rate.

16. A method for advancing flow of fluid in a fluid flow device at a selected one of a plurality of fluid flow rates, the fluid flow device including a blower, said method comprising the steps of:

providing a housing defining a body thereof;

moveably securing a wall of the housing to the body to one of a selectable plurality of positions relative to the body;

providing a motion device, the motion device including a servo motor;

securing the motion device to the body and to said wall, wherein the motion device is configured to position the wall at a plurality of wall positions;

rotatably mounting a fluid moving member to the housing, the fluid moving member including a blower wheel;

providing a motor for rotating the fluid moving member at a plurality of rotational speeds;

providing a controller;

connecting the controller to the motor for rotating the fluid moving member and to the wall;

defining an energy usage rate for the motor for rotating the fluid moving member for each combination of rotational speeds and wall positions;

transmitting a fluid flow signal to said controller to command the fluid flow device to operate at the selected one of a plurality of fluid flow rates;

utilizing the controller to select, based on the energy usage rates, rotational speeds, and wall positions table stored in a memory of the controller, a combination of an optimum wall position and an optimum rotational speed to provide a minimum energy usage rate at the selected one of a plurality of fluid flow rates;

sending a wall position signal to said motion device to move said wall to said optimum wall position; and sending a rotational speed signal to said motor for rotating the fluid moving member to rotate the fluid moving member at the optimum rotational speed.

* * * * *